United States Patent
Lynch August et al.

(10) Patent No.: US 10,046,522 B2
(45) Date of Patent: Aug. 14, 2018

(54) SURFACE ANGLE MODEL EVALUATION PROCESS FOR ADDITIVE MANUFACTURING

(71) Applicant: Stratasys, Inc., Eden Prairie, MN (US)

(72) Inventors: Jacob David Lynch August, Eagan, MN (US); William J. Swanson, St. Paul, MN (US); Kevin Johnson, Minneapolis, MN (US)

(73) Assignee: Stratasys, Inc., Eden Prairie, MN (US)

( * ) Notice: Subject to any disclaimer, the term of this patent is extended or adjusted under 35 U.S.C. 154(b) by 696 days.

(21) Appl. No.: 14/632,280

(22) Filed: Feb. 26, 2015

(65) Prior Publication Data

US 2016/0250810 A1    Sep. 1, 2016

(51) Int. Cl.
| | | |
|---|---|---|
| *B29C 67/00* | (2017.01) | |
| *G05B 19/4099* | (2006.01) | |
| *G06F 17/10* | (2006.01) | |
| *G06F 17/50* | (2006.01) | |
| *B33Y 50/02* | (2015.01) | |

(52) U.S. Cl.
CPC ...... *B29C 67/0088* (2013.01); *G05B 19/4099* (2013.01); *G06F 17/10* (2013.01); *G06F 17/50* (2013.01); *B33Y 50/02* (2014.12); *G05B 2219/35134* (2013.01); *G05B 2219/49007* (2013.01); *G06F 2217/08* (2013.01)

(58) Field of Classification Search
None
See application file for complete search history.

(56) References Cited

U.S. PATENT DOCUMENTS

| | | |
|---|---|---|
| 5,503,785 A | 4/1996 | Crump et al. |
| 6,004,124 A | 12/1999 | Swanson et al. |
| 6,722,872 B1 | 4/2004 | Swanson et al. |
| 7,127,309 B2 | 10/2006 | Dunn et al. |
| 7,374,712 B2 | 5/2008 | Swanson et al. |
| 7,384,255 B2 | 6/2008 | LaBossiere et al. |
| 7,604,470 B2 | 10/2009 | LaBossiere et al. |
| 7,625,200 B2 | 12/2009 | Leavitt |
| 7,896,209 B2 | 3/2011 | Batchelder et al. |
| 7,938,356 B2 | 5/2011 | Taatjes et al. |
| 8,153,182 B2 | 4/2012 | Comb et al. |
| 8,419,996 B2 | 4/2013 | Swanson et al. |

(Continued)

OTHER PUBLICATIONS

International Search Report and Written Opinion dated Jun. 20, 2016 for corresponding International Application No. PCT/US2016/019702, filed Feb. 26, 2016.

(Continued)

*Primary Examiner* — Paul Yanchus, III
(74) *Attorney, Agent, or Firm* — Peter J. Ims; Westman, Champlin & Koehler, P.A.

(57) ABSTRACT

A method for printing a three-dimensional part in an additive manufacturing process, which includes calculating surface plane angles relative to one or more of the coordinate axes as a function of surface area of the surface geometry, calculating a build score for each coordinate axis as a function of the calculated surface plane angles, and selecting an orientation for the digital model in the coordinate system based at least in part on the calculated build scores. The build scores preferably predict which part orientations are likely to provide good surface quality for the printed three-dimensional part.

17 Claims, 12 Drawing Sheets

(56) References Cited

U.S. PATENT DOCUMENTS

| | | | |
|---|---|---|---|
| 8,818,544 B2 | 8/2014 | Nehme et al. | |
| 2007/0233298 A1* | 10/2007 | Heide | G06F 17/50 700/98 |
| 2012/0267827 A1* | 10/2012 | Kritchman | G05B 19/4099 264/308 |
| 2013/0078073 A1 | 3/2013 | Comb et al. | |
| 2013/0161432 A1 | 6/2013 | Mannella et al. | |
| 2013/0161442 A1 | 6/2013 | Mannella et al. | |
| 2013/0333798 A1 | 12/2013 | Bosveld et al. | |
| 2014/0158802 A1 | 6/2014 | Batchelder et al. | |
| 2015/0269289 A1* | 9/2015 | Kim | G06F 17/5009 703/6 |
| 2016/0085882 A1* | 3/2016 | Li | G06F 17/50 703/1 |

OTHER PUBLICATIONS

Mohammad Taufin and Prashant K. Jain: "Role of build orientation in layered manufacturing: a review", Int. J. Manufacturing Technology and Management, vol. 27, Nos. 1-3, 2013, pp. 47-73.

S. H. Masood and W. Rattanawong AL: "A Generic Part Orientation System Based on Volumetric Error in Rapid Prototyping", Int J Adv Manuf Technol (2002), 19:209-216.

* cited by examiner

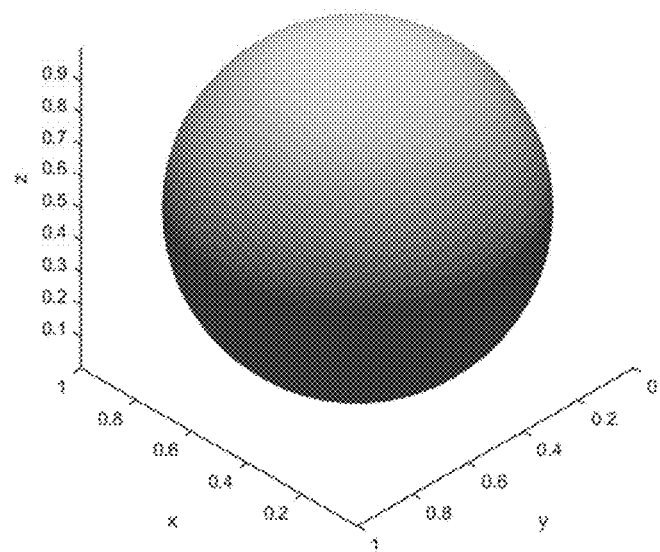
FIG. 21
FIG. 22
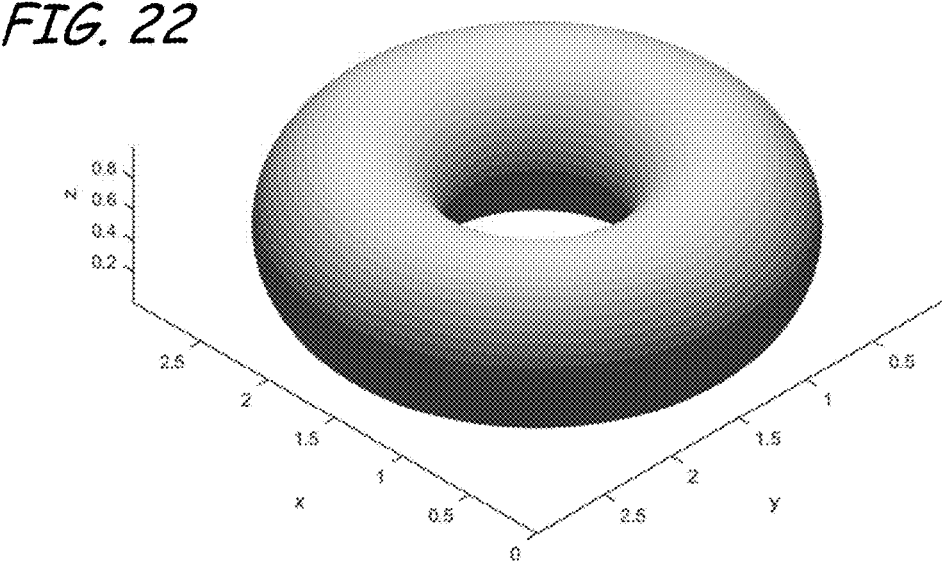

US 10,046,522 B2

SURFACE ANGLE MODEL EVALUATION PROCESS FOR ADDITIVE MANUFACTURING

BACKGROUND

The present disclosure relates to additive manufacturing processes for printing or otherwise producing three-dimensional (3D) parts and support structures. In particular, the present disclosure relates to digital model evaluations for use in printing 3D parts structures with additive manufacturing techniques.

Additive manufacturing systems are used to print or otherwise build 3D parts from digital models or representations of the 3D parts (e.g., STL format files) using one or more additive manufacturing techniques. Examples of commercially available additive manufacturing techniques include extrusion-based techniques, jetting, selective laser sintering, powder/binder jetting, electron-beam melting, digital light processing (DLP), and stereolithographic processes. For each of these techniques, the digital representation of the 3D part is initially sliced into multiple horizontal layers. For each sliced layer, a tool path is then generated, which provides instructions for the particular additive manufacturing system to print the given layer.

For example, in an extrusion-based additive manufacturing system, a 3D part may be printed from a digital representation of the 3D part in a layer-by-layer manner by extruding a flowable part material. The part material is extruded through an extrusion tip carried by a print head of the system, and is deposited as a sequence of roads on a platen in planar layers. The extruded part material fuses to previously deposited part material, and solidifies upon a drop in temperature. The position of the print head relative to the substrate is then incremented, and the process is repeated to form a 3D part resembling the digital representation.

In fabricating 3D parts by depositing layers of a part material, supporting layers or structures are typically built underneath overhanging portions or in cavities of 3D parts under construction, which are not supported by the part material itself. A support structure may be built utilizing the same deposition techniques by which the part material is deposited. The host computer generates additional geometry acting as a support structure for the overhanging or free-space segments of the 3D part being formed. Support material is then deposited pursuant to the generated geometry during the printing process. The support material adheres to the part material during fabrication, and is removable from the completed 3D part when the printing process is complete.

SUMMARY

An aspect of the present disclosure is directed to a method for printing a 3D part in an additive manufacturing process, which includes receiving a digital model of the 3D part to a computer, where the digital model is provided in a coordinate system having a plurality of coordinate axes, and has a surface geometry. The method also includes surface plane angles relative to one or more of the coordinate axes as a function of surface area of the surface geometry. The method further includes calculating a build score for each of the one or more coordinate axes as a function of the calculated surface plane angles, and selecting an orientation for the digital model in the coordinate system based at least in part on the calculated build scores. The build scores preferably predict which part orientations are likely to provide good surface quality for the printed 3D part.

Another aspect of the present disclosure is directed to a method for printing a 3D part in an additive manufacturing process, which includes receiving a digital model of the 3D part to a computer, where the digital model provided in a coordinate system having a plurality of coordinate axes. The method also includes calculating primary criteria values (e.g., support material volume and/or build time) for two or more of the coordinate axes, evaluating the digital model for surface quality for each of the for two or more of the coordinate axes, and eliminating any coordinate axis having a surface quality that does not meet a minimum surface quality threshold to provide one or more remaining coordinate axes. The method also includes selecting an orientation for the digital model in the coordinate system from the one or more remaining coordinate axes based at least in part on the calculated primary criteria values. This method preferably eliminates part orientations having low surface quality.

Another aspect of the present disclosure is directed to a method for printing a 3D part in an additive manufacturing process, which includes receiving a digital model of the 3D part to a computer, where the digital model provided in a coordinate system having a plurality of coordinate axes. The method also includes evaluating the digital model for surface quality for two or more of the coordinate axes, calculating one or more secondary criteria values for each of the two or more of the coordinate axes, and eliminating any coordinate axis having a secondary criteria value that does not meet a minimum secondary criteria threshold to provide one or more remaining coordinate axes. The method also includes selecting an orientation for the digital model in the coordinate system from the one or more remaining coordinate axes based at least in part on the evaluated surface qualities.

Definitions

Unless otherwise specified, the following terms as used herein have the meanings provided below:

The term "additive manufacturing system" refers to a system that prints 3D parts and/or support structures at least in part using an additive manufacturing technique. The additive manufacturing system may be a stand-alone unit, a sub-unit of a larger system or production line, and/or may include other non-additive manufacturing features, such as subtractive-manufacturing features, pick-and-place features, two-dimensional printing features, and the like.

The terms "print", "printing", and the like, with respect to printing a 3D part and/or support structure, refer to building or otherwise producing the 3D part and/or support structure from one or more materials using one or more additive manufacturing techniques, such as extrusion-based techniques, jetting, selective laser sintering, powder/binder jetting, electron-beam melting, digital light processing (DLP), stereolithography, selective laser melting, direct laser metal sintering, and electrostatographic processes, and the like.

The terms "command", "commanding", and the like, with reference to a controller assembly commanding a device (e.g., a print head, a gantry, a motor, or the like), refers to the direct and/or indirect relaying of control signals from the controller assembly to the device such that the device operates in conformance with the relayed signals. The signals may be relayed in any suitable form, such as communication signals to a microprocessor on the device, applied electrical power to operate the device, and the like.

The term "providing", such as for "providing a device", when recited in the claims, is not intended to require any particular delivery or receipt of the provided item. Rather, the term "providing" is merely used to recite items that will be referred to in subsequent elements of the claim(s), for purposes of clarity and ease of readability.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

The terms "at least one" and "one or more of" an element are used interchangeably, and have the same meaning that includes a single element and a plurality of the elements, and may also be represented by the suffix "(s)" at the end of the element.

The terms "about" and "substantially" are used herein with respect to measurable values and ranges due to expected variations known to those skilled in the art (e.g., limitations and variabilities in measurements).

BRIEF DESCRIPTION OF THE DRAWINGS

FIGS. 13-22 are example views of digital models evaluated for surface quality pursuant to the surface-quality evaluation of the present disclosure.

DETAILED DESCRIPTION

The present disclosure is directed to a system and process for printing 3D parts with additive manufacturing systems, which includes a surface-quality evaluation that can be used to quickly predict part orientations that are likely to provide good surface quality. In a first embodiment, the surface-quality evaluation can be used to directly establish a preferred printing z-axis for orienting a digital model (used to print a 3D part). Alternatively, in a second embodiment, the surface-quality evaluation may be part of a multiple-criteria evaluation for part orientation, where the part orientations may also be evaluated using one or more additional measurable criteria, such as support material volume, build time, part strength, post-build processing time (e.g., support removal time), overall processing time, cost, and the like.

Figure 1:
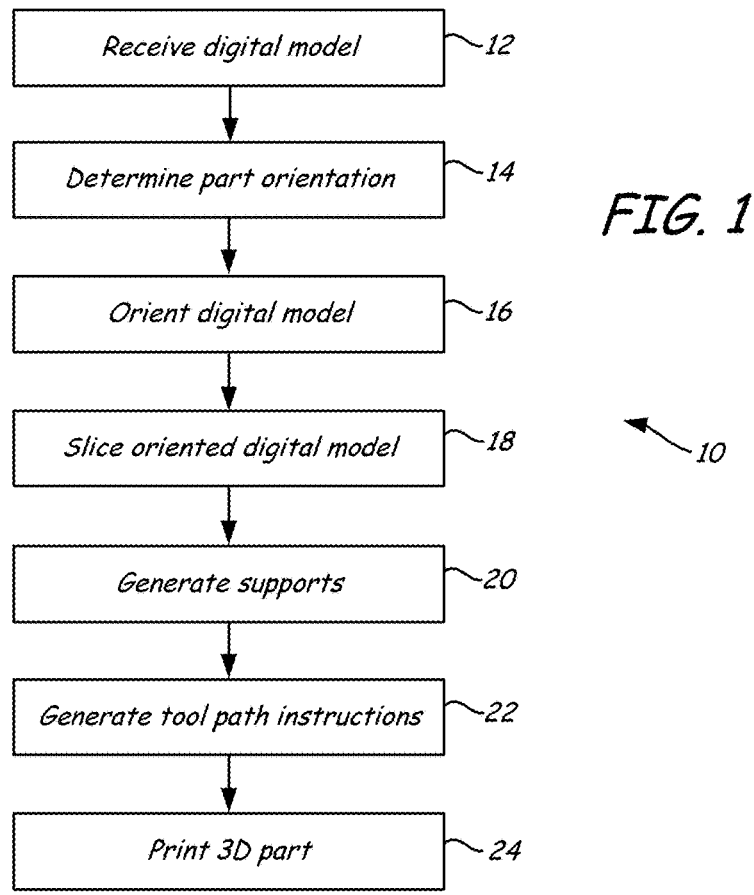
FIG. 1 is a flow diagram of a method for printing a 3D part using a part orientation process, where the part orientation process includes a surface-quality evaluation of the present disclosure.

FIG. 1 illustrates an example method 10 for printing a 3D part from a digital model using an additive manufacturing system, which includes the part orientation process. As shown, method 10 includes steps 12-24, and initially involves receiving a digital model to a computer (step 12), and determining a preferred part orientation for the digital model based on one or more measurable criteria (step 14). As discussed below, step 14 of method 10 preferably includes a surface-quality evaluation, which can be used to identify which part orientation is likely to provide the best surface quality, and/or to predict which part orientations are likely to provide low or otherwise unacceptable surface quality (which can be eliminated).

Once the part orientation is determined, the digital model may be oriented to match this part orientation (step 16). This orientation step may involve establishing a new printing z-axis direction for the digital model, effectively rotating the digital model in the coordinate system to align with the new printing z-axis direction. In some cases, the digital model initially received may already be correctly oriented in the preferred part orientation. In these cases, step 16 does not actually change the part orientation for the digital model.

Once oriented, the digital model can then be sliced into multiple layers (step 18), support structure layers may be generated (step 20), and tool path instructions for printing each layer can be generated (step 22). The tool path instructions can then be transmitted to an additive manufacturing system and a 3D part corresponding to the oriented digital model can be printed in a layer-by-layer manner (step 24). As will be seen by the following discussion, the steps of method 10 are particularly suitable for use in an automated, on-demand 3D printing service, where customers may submit their digital models for printing and delivery.

Figure 2:
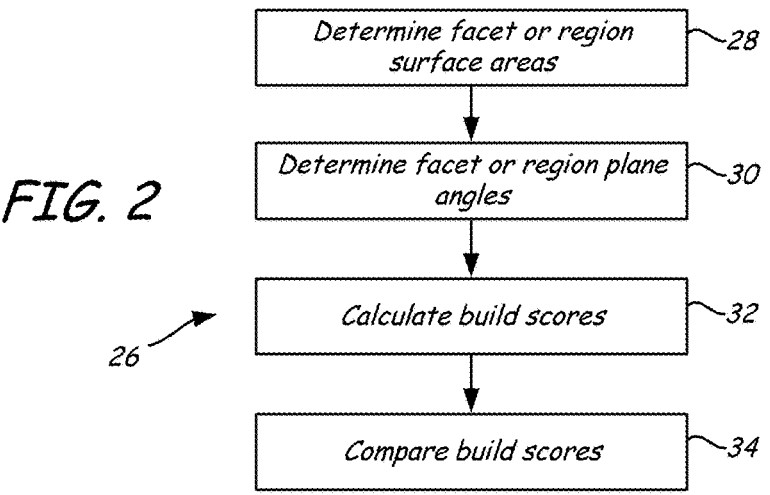
FIG. 2 is a flow diagram of the surface-quality evaluation of the present disclosure.

FIG. 2 illustrates an example method 26 for evaluating a digital model based on surface quality, and may be used to determine a preferred part orientation, pursuant to step 14 of method 10. As shown in FIG. 2, method 26 includes steps 28-34, and may be performed on any suitable type of digital model. For example, a digital model from a Standard Tessellation Language (STL) data file typically includes multiple facets (e.g., triangular facets) that describe its surface geometry.

Pursuant to method 26, the surface quality of a digital model may determined by calculating or otherwise determining a surface area A for each facet (step 28), and a corresponding normal angle $\alpha$ for the facet relative to each coordinate axis, which is equivalent to the angle between the facet plane and a proposed build surface (step 30). For example, in a Cartesian coordinate system having an x-axis, a y-axis, and a z-axis that are orthogonal to each other, the evaluation process may produce plane angles $\alpha_x$, $\alpha_y$, $\alpha_z$ and surface area A for each facet. For convenience, these plane angles and surface areas may be referred to as data sets $(\alpha_{x,i}/\alpha_{y,i}/\alpha_{z,i}/A_i)$, $(\alpha_{x,i+1}/\alpha_{y,i+1}/\alpha_{z,i+1}/A_{i+1})$, $(\alpha_{x,i+2}/\alpha_{y,i+2}/\alpha_{z,i+2}/A_{i+2})$, ... $(\alpha_{x,n}/\alpha_{y,n}/\alpha_{z,n}/A_n)$ for "n" total facets in the digital model.

Based on these data sets, a "build score" for each coordinate axis (e.g., $D_x$, $D_y$, $D_z$) can be calculated (step 32), which is an average plane angle for the surfaces of the digital model relative to the given coordinate axis, and is preferably weighted by the facet surface areas and/or normalized for ease of ranking and comparison. These build scores can then be compared to identify which part orientation will likely provide the best surface quality, and/or which part orientations will provide poor or otherwise unacceptable surface quality (step 34).

It has been found that, for many additive manufacturing processes that print 3D parts in a layer-by-layer manner, the surface quality of a 3D part can be increased by aligning the surfaces of the 3D part as close as possible to the printing z-axis (e.g., a vertical printing axis) or to the x-y build plane (e.g., in a horizontal build plane). In other words, sloped surfaces are preferably minimized since they can create significant stair-step features due to the layer-by-layer printing. While these stair-step features typically do not affect the part strengths, they can significantly affect the visual aesthetics of the printed 3D parts, which can be very important for many applications.

It has also been found that surface angle deviations from the printing z-axis are typically more forgiving than surface angle deviations from the x-y build plane. In fact, it has been found that surfaces oriented with even small angles out of the x-y build plane (e.g., even one degree) can create significant stair-step features. As such, to improve the surface quality of a printed 3D part, the surfaces of the 3D part are preferably oriented (i) parallel or nearly parallel to the printing z-axis, or (ii) parallel to the x-y build plane.

This is where the build scores can be very effective for predicting orientations that are likely to provide good surface quality. The build score for each coordinate axis (e.g., $D_x$, $D_y$, $D_z$) quantifies the plane angles of the facets relative to the given coordinate axis, preferably weighted by their surface areas. This effectively describes how closely the surfaces of the digital model are parallel to each coordinate axis, allowing the surface-quality comparisons to be made relative to each coordinate axis.

Figure 3:
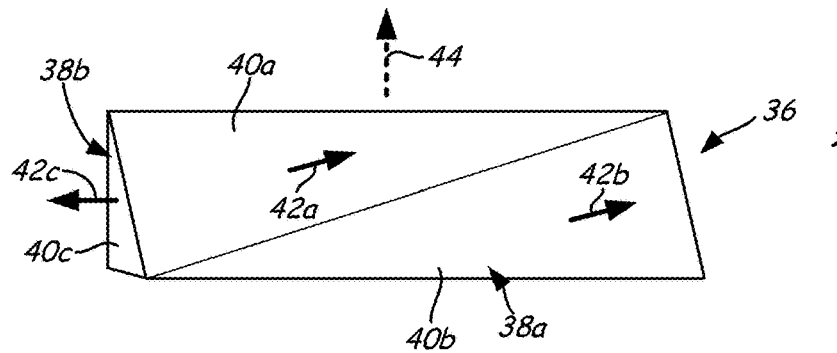
FIG. 3 is a front perspective view of an example digital model in an initial orientation.
Figure 4:
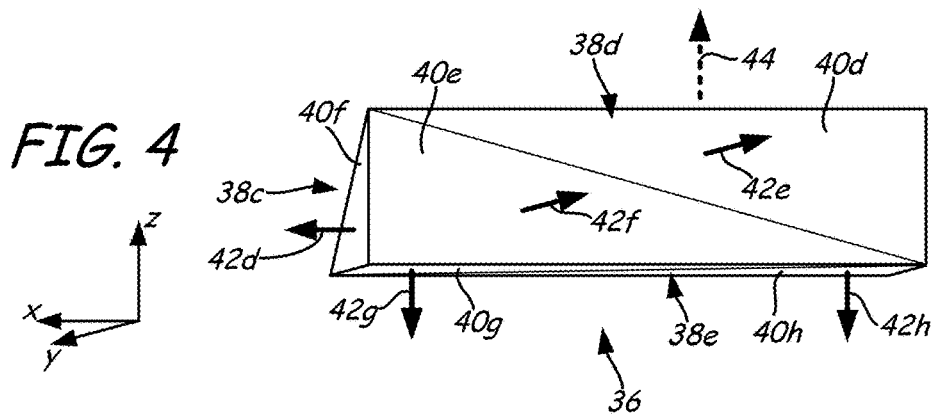
FIG. 4 is a rear perspective view of the example digital model shown in FIG. 3.
Figure 5:
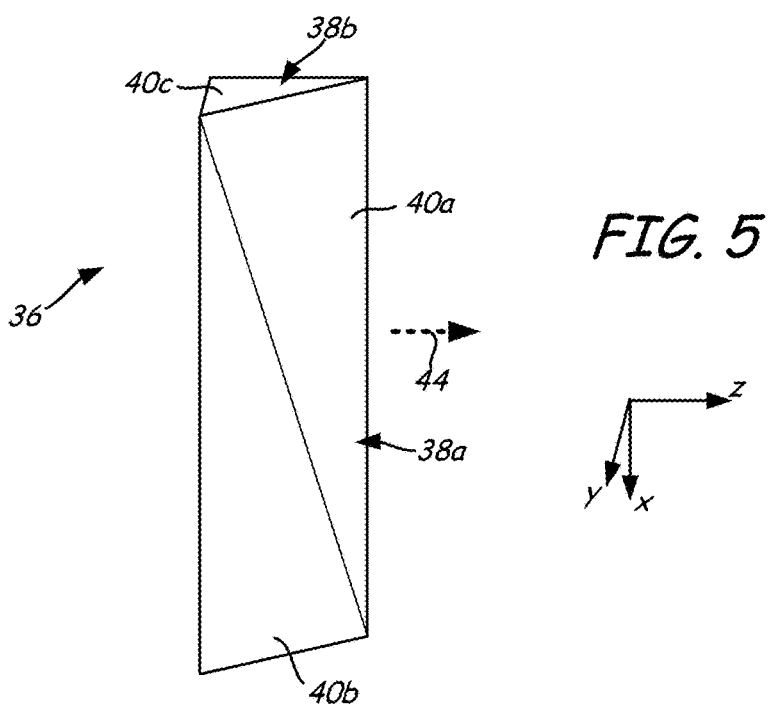
FIG. 5 is a front perspective view of the example digital model shown in FIGS. 4 and 4, oriented based on the surface-quality evaluation.

This surface-quality evaluation under method 26 is best explained by example. FIGS. 3-5 illustrate an example digital model 36 that can be evaluated for surface quality pursuant to method 26 (shown in FIG. 2). As shown in FIGS. 3 and 4, digital model 36 has a simple triangular prism geometry with a front sloped surface 38a, a left surface 38b, a right surface 38c, a rear surface 38d, and a bottom surface 38e, where, for ease of discussion, surfaces 38c and 38d each define a right, isosceles triangle. While described below with reference to digital model 36, the surface-quality evaluation is particularly suitable for digital models having a variety of complex surface geometries. In fact, some digital models have surface geometries that are so complex that it can be difficult or impossible for a person to intuitively ascertain which orientation will provide the best surface quality.

In some embodiments, digital model 36 can be described by a tessellated data file, such as an ASCII or binary STL data file, which describes surfaces 38a-38e with facets 40a and 40b (for front sloped surface 38a), facet 40c (for left surface 38b), facet 40d (for right surface 38c), facets 40e and 40f (for rear surface 38d), and facets 40g and 40h (for bottom surface 38e). Facets 40a-40h are example triangular facets for describing surfaces 38a-38e, and respectively have unit normal vectors 42a-42h. However, any suitable facet geometry (or multiple different geometries) may alternatively be used to describe surfaces 38a-38e.

Furthermore, the term "facet" may refer to an individual facet of a digital model (e.g., as described in an STL data file) or a set of adjacent and/or connected facets that are in the same plane (effectively defining a larger surface area with the same plane angle). For example, as shown in FIG. 3, facets 40a and 40b, which are adjacent and connected, and are planar with each other, may alternatively be treated as a single rectangular facet with four corner vertices. Alternatively, as discussed below, the surface of digital model 36 may be analyzed without relying on facets 40a-40h, allowing the surface-quality evaluation to also be applied to non-tessellated data files (e.g., non-STL data files).

In the current example, digital model 36 is oriented such that its initial upright direction 44 is parallel to the printing z-axis. If the orientation of digital model 36 is not otherwise modified, a 3D part would be printed with the same orientation, and would likely exhibit stair-step features along sloped front surface 38a.

Pursuant to step 28 of method 26, a computer may analyze one or more of facets 40a-40h, and more preferably each facet 40a-40h, to determine their surfaces areas. Assume for this example that digital model 36 has a length along the x-axis of 5 units, a length along the y-axis of 1 unit, and a height along the z-axis of 2 units. As such, front sloped surface 38a has a total surface area of 11.2 area units (rounded for ease of discussion), side surfaces 38b and 38c each have a total surface area of 1 area unit, rear surface 38d has a total surface area of 10 area units, bottom surface 38e has a total surface area of 5 area units, and digital model 36 has a total surface area of 28.1 area units.

Accordingly, facets 40a and 40b each have a surface area of 5.59 area units, facets 40c and 40f each have a surface area of 1 area unit, facets 40d and 40e each have a surface area of 5 area units, and facets 40g and 40h each have a surface area of 2.5 units. As discussed below, the surface areas of facet 40a-40h may be calculated based on their vertex coordinate locations.

Facets 40a-40h provide a convenient mechanism for dividing each surface of digital model 36 into smaller sub-regions for evaluation. However, the computer may alternatively analyze the surfaces of digital model 36 based on other predefined sub-regions of each surface without relying on facets 40a-40h. For example, surface 38a-38e may be integrated as a function of surface area. As mentioned above, this can be beneficial in applications where digital model 36 is described by a non-tessellated data file.

Pursuant to step 30 of method 26, the computer may also analyze one or more of facets 40a-40h, and more preferably each facet 40a-40h (or other integrated areas), to determine their plane angles relative to each coordinate axis. The plane angles of facets 40a-40h or other integrated areas may each be determined by their unit normal vectors 42a-42h. Unit normal vectors 42a-42h may be extracted from the STL data file, or more preferably, calculated based on the vertex coordinate locations of facets 40a-40h (or other integrated areas). In some embodiments, the unit normal vectors 42a-42h may be calculated based on the vertex coordinate locations of facets 40a-40h, and then optionally compared to the unit normal vectors listed in the STL data file to identify any data discrepancies in the STL data file.

In the current example, facet 40a has a unit normal vector 42a that extends in the y-z plane, perpendicular to the x-axis, at 26.6 degrees relative to the y-axis, and 63.4 degrees relative to the z-axis. As such, the plane angles and surface area for facet 40a may be represented by the data set $(\alpha_{x,i}/\alpha_{y,i}/\alpha_{z,i}/A_i)$ as (90°/26.6°/63.4°/5.59) in degrees or (1.571/0.464/1.11/5.59) in radians.

In some preferred embodiments, plane angles that are close to zero degrees or radians relative to a given coordinate axis (e.g., less than about 0.05, 0.03, or even 0.01 radians) may be replaced with a 90-degree value. For example, the plane angles and surface area for facet 40c may initially be represented by the data set (0°/90°/90°/1) in degrees or (0/1.571/1.571/1) in radians. However, the $\alpha_x$ value is preferably replaced with a 90-degree or arcos(0) value such that the plane angles and surface area for facet 40c may be represented by the data set (90°/90°/90°/1) in degrees or (1.571/1.571/1.571/1) in radians.

As briefly discussed above, the surfaces of a printed 3D part are preferably oriented (i) parallel or nearly parallel to the printing z-axis, or (ii) parallel to the x-y build plane. Replacing the plane angles that are close to zero degrees or radians relative to a given coordinate axis with a 90-degree value (or close to a 90-degree value) allows facet plane angles that are parallel to the given axis to be treated as a perpendicular facet plane angle, which captures part surfaces that will be parallel to the x-y build plane. If this modification were otherwise omitted, the surface-quality evaluation would not consider the surfaces that are parallel to the x-y build plane.

Furthermore, because the surface-quality evaluation relies on the magnitudes of the plane angles relative to the coordinate axes, the positive or negative directions of the angles are preferably ignored (i.e., based on their absolute values). This process can be repeated for each of the remaining facets of digital model 36, as shown in the following Table 1, where all angles are based on their absolute values (i.e., no negative angles):

TABLE 1

| Facet | $\alpha_x$ (radians) | $\alpha_y$ (radians) | $\alpha_z$ (radians) | A (area units) |
| --- | --- | --- | --- | --- |
| Facet 40a | 1.571 | 0.464 | 1.110 | 5.590 |
| Facet 40b | 1.571 | 0.464 | 1.110 | 5.590 |
| Facet 40c | 1.571 | 1.571 | 1.571 | 1.000 |
| Facet 40d | 1.571 | 1.571 | 1.571 | 5.000 |
| Facet 40e | 1.571 | 1.571 | 1.571 | 5.000 |
| Facet 40f | 1.571 | 1.571 | 1.571 | 1.000 |
| Facet 40g | 1.571 | 1.571 | 1.571 | 2.500 |
| Facet 40h | 1.571 | 1.571 | 1.571 | 2.500 |

The computer may then calculate the build score for each coordinate axis, $D_x$, $D_y$, $D_z$, preferably as an average facet plane angle (or integrated area plane angle) that is weighted by the surface areas, and which can optionally be normalized to a maximum angle that any plane can be oriented relative to a coordinate axis and/or to a total surface area of digital model 10 (step 32 of method 26). In some embodiments, the build score for each coordinate axis can be calculated by the following equation:

$$D_p = \frac{\oint \alpha_p dA}{R} \cong \frac{\sum_i^n \alpha_{p,i} A_i}{R} \quad \text{(Equation 1)}$$

where $D_p$ is the build score for a given coordinate axis, such as $D_x$, $D_y$, $D_z$, and is the integral or sum of individual facet scores $\alpha_{p,i} A_i/R$. As such, for the above-discussed Cartesian coordinate system with the x-axis, y-axis, and z-axis, Equation 1 can be represented by the following equations:

$$D_x = \frac{\oint \alpha_x dA}{R} \cong \frac{\sum_i^n \alpha_{x,i} A_i}{R} \quad \text{(Equation 2)}$$

$$D_y = \frac{\oint \alpha_y dA}{R} \cong \frac{\sum_i^n \alpha_{y,i} A_i}{R} \quad \text{(Equation 3)}$$

$$D_z = \frac{\oint \alpha_z dA}{R} \cong \frac{\sum_i^n \alpha_{z,i} A_i}{R} \quad \text{(Equation 4)}$$

While the surface-quality evaluation is described herein with reference to the x-axis, y-axis, and z-axis of a Cartesian coordinate system, the surface-quality evaluation may also be performed with additional (or alternative) coordinate axes, such as axes that are 30 degrees, 45 degrees, and/or 60 degrees relative to each of the x-axis, y-axis, and z-axis. This can further improve the accuracy in identifying an orientation that is likely to provide the best surface quality. Alternatively, any suitable coordinate system may be used, such as a Cartesian coordinate system, a polar coordinate system, and the like.

The relationship R in Equations 1-4 may include any suitable value(s) for normalizing the build scores. For example, the relationship R may include the total surface area of digital model 36, $A_{model}$, for normalizing the individual surface areas of facets 40a-40h. The relationship R may also (or alternatively) be normalized to the maximum angle that any facet plane can be oriented relative to a coordinate axis, referred to as $angle_{max}$.

These two factors for the relationship R may allow the build scores to range between 0 and 1 for ease of ranking and comparison, as mentioned above. Accordingly, Equation 1 may be represented by the following equation:

$$D_p = \frac{\oint \alpha_p dA}{(angle_{max})(A_{model})} \cong \frac{\sum_i^n \alpha_{p,i} A_i}{(angle_{max})(A_{model})} \quad \text{(Equation 5)}$$

and Equations 2-4 may be represented by the following equations:

$$D_x = \frac{\oint \alpha_x dA}{(angle_{max})(A_{model})} \cong \frac{\sum_i^n \alpha_{x,i} A_i}{(angle_{max})(A_{model})} \quad \text{(Equation 6)}$$

$$D_y = \frac{\oint \alpha_y dA}{(angle_{max})(A_{model})} \cong \frac{\sum_i^n \alpha_{y,i} A_i}{(angle_{max})(A_{model})} \quad \text{(Equation 7)}$$

$$D_z = \frac{\oint \alpha_z dA}{(angle_{max})(A_{model})} \cong \frac{\sum_i^n \alpha_{z,i} A_i}{(angle_{max})(A_{model})} \quad \text{(Equation 8)}$$

In the current example, the total surface area of digital model ($A_{model}$) is 28.1 area units, and the maximum angle any facet plane can be oriented relative to a coordinate axis (angle$_{max}$) is 90 degrees or 1.571 radians (i.e., the arccosine of zero or ninety degrees). Based on the calculated values listed in Table 1 and Equations 6-8, the build score for the x-axis (D$_x$) is 1.000, the build score for the y-axis (D$_y$) is 0.720, and the build score for the z-axis (D$_z$) is 0.883.

In an alternative embodiment, rather than relying on a linear relationship of the facet scores $\alpha_{p,i}A_i/R$, each facet score may be assigned a non-linear value, such as a logarithmic score that further emphasizes the effects of a sloped surface on surface quality. For example, Equation 5 may be replaced with the following expression:

$$D_p = \sum_{i}^{n} f\left(\frac{\alpha_{p,i}A_i}{R}\right) \quad \text{(Equation 9)}$$

where $f(\alpha_{p,i}A_i/R)$ is the non-linear function of the facet score $\alpha_{p,i}A_i/R$, such as a value of "1" for facet scores between 0.000 and 0.500, a value of "2" for facet scores between 0.500 and 0.750, a value of "3" for facet scores between 0.750 and 0.900, a value of "4" for facet scores between 0.900 and 0.950, and a value of "5" for facet scores between 0.950 and 1.000. The particular variables in the non-linear function and the value ranges may vary depending on the desired non-linear relationships. In any case, the non-linear values further emphasize the preference for surfaces that are oriented (i) parallel or nearly parallel to the printing z-axis, or (ii) parallel to the x-y build plane.

The resulting build scores may then be compared, pursuant to step 34 of method 26. As mentioned above, in some embodiments, the highest build score may be identified, which corresponds to the part orientation that is likely to provide the best surface quality for printing 3D parts from most geometries. Alternatively, build scores that are below a minimum surface quality can be identified, and used to eliminate part orientations having low surface quality from be selected under a multiple-criteria evaluation, as discussed below.

In some embodiments, the build scores may also be grouped into ranking sets. For example, the build scores may be grouped into ranking sets ranging from 0.0≤D$_p$<0.5 (one star ranking), 0.5≤D$_p$<0.7 (two star ranking), 0.7≤D$_p$<0.9 (three star ranking), and 0.9≤D$_p$<1.0 (four star ranking). These ranking sets can provide a quick comparison of the relative part qualities between the potential build orientations.

Additionally, in other embodiments, the build scores and/or individual facet scores may be displayed graphically, such as with colored images or other digital representations of digital model 36. One particularly suitable application involves displaying digital model 36 with each facet colored based on its individual facet score (e.g., green for a high score and red for a low score). If desired, the computer can also allow the user to rotate or pivot digital model 36 and view the color changes in the facets as digital model 36 is manipulated. In effect, this can provide a fun and interactive user experience, and allows the user to review the build scores and/or facet scores, and optionally to select a desired orientation for digital model 36.

The build scores and/or facet scores may also be displayed using any other suitable mechanism. For instance, digital model 36 in each orientation can be displayed with virtual layer lines that can depict the relative surface qualities (e.g., stair-step effects for sloped surfaces). This can further enhance the user experience and provide a greater level of information for allowing a user to select a desired orientation for digital model 36.

In some further embodiments, steps 30-34 of method 26 can optionally be repeated for additional coordinate axes, if desired. For instance, once the highest build score is identified in step 34, the computer can determine the plane angle for each facet 40a-40h relative to one or more additional coordinate axes, such as in the vicinity of the x-axis. This can be performed using any suitable logic, such as in an iterative manner, a recursive manner, and/or a random manner. This allows the computer to identify whether any non-primary coordinate axis can provide a higher build score.

Once the highest build score is identified, the computer may then orient digital model 36 such that the coordinate axis with the identified highest build score is set at a new printing z-axis, pursuant to step 16 of method 10. As shown in FIG. 3, because the original x-axis has the highest build score in the current example, digital model 36 may be oriented (e.g., rotated) such that the original x-axis is now aligned with the printing z-axis. This is further illustrated by the direction of initial upright direction arrow 44, which now is pointing horizontally in the x-y build plane.

As can be seen in FIG. 3, this orientation for digital model 36 is intuitively the correct orientation for printing a 3D part based having the best surface quality. In particular, each surface of digital model 36 is now parallel to the printing z-axis (surfaces 38a, 38d, and 38e) or parallel to the x-y build plane (surfaces 38b and 38c). There are no surfaces oriented at sloped angles relative to the printing z-axis or x-y build plane to generate stair-step features. In comparison, if either the y-axis or z-axis was selected as the new printing z-axis, one or more surfaces would be orientated at a sloped angle relative to the printing z-axis and/or the x-y build plane. As discussed above, this can potentially result in stair-step features, which can reduce surface quality.

Digital model 36 in this orientation can then be sliced into multiple layers (step 18 of method 10), support structure layers may be generated (step 20 of method 10), and tool path instructions for printing each layer can be generated (step 22 of method 10). The tool path instructions can then be transmitted to an additive manufacturing system and a 3D part corresponding to the oriented digital model 36 in FIG. 3 can be printed in a layer-by-layer manner (step 24 of method 10).

The steps discussed in the example for FIGS. 1-3 are directed to a process where digital model 36 is oriented based solely on the surface-quality evaluation of method 26. However, as mentioned above, in other embodiments, the preferred part orientation for digital model 36 can also be determined based on other measurable criteria, such as support material volume, build time, part strength, post-build processing time (e.g., support removal time), overall processing time, cost, and the like.

FIGS. 5A and 5B illustrate example methods for evaluating a digital model based on multiple measurable criteria (including surface quality), and may also be used to determine a preferred part orientation, pursuant to step 14 of method 10. For ease of discussion, the multiple criteria can be grouped into one or more "primary criteria" and one or more "secondary criteria" based on their relative importance for a given application. For instance, in an on-demand 3D printing service, support material volume and/or build time are typically the most important or primary criteria for customers since they can directly affect the cost and delivery time. In this case, surface quality and part strength can potentially be less important to customers, and characterized as secondary criteria.

Alternatively, in other applications, such as for artistic or architectural uses, surface quality can be a very important or primary criteria, and support material volume, build time, and/or part strength may be characterized as secondary criteria. Furthermore, in industrial applications, part strength may be a primary criteria, and support material volume, build time, and/or surface quality may be characterized as secondary criteria.

Figure 6:
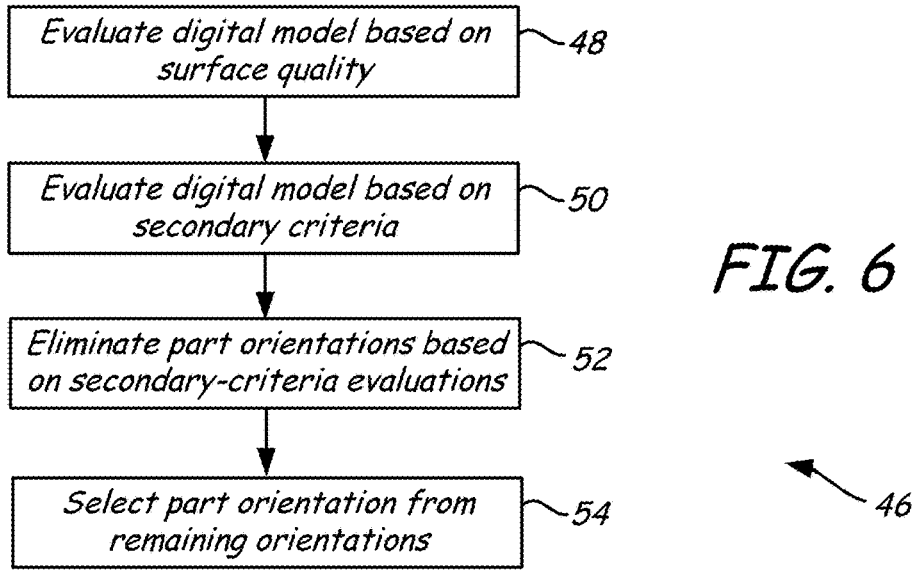
FIG. 6 is a flow diagram of a method for performing the part orientation process based on multiple criteria, where the surface-quality evaluation is a primary criteria.

In any case, the secondary criteria can still be useful for determining a preferred part orientation. For example, part orientations that fall below minimum acceptable thresholds for the secondary criteria can be eliminated from contention, regardless of their primary criteria values. Accordingly, the surface-quality evaluation of method 26 can be used as either a primary criteria or a secondary criteria, depending on the particular application. FIG. 6 focuses on a method 46 (having steps 48-54) where the surface-quality evaluation of method 26 is a primary criteria, and FIG. 7 focuses on a method 56 (having steps 58-64) where the surface-quality evaluation is a secondary criteria.

As shown in FIG. 6, method 46 may initially involve evaluating a digital model based on surface quality as a primary criteria, where the surface-quality evaluation may be performed pursuant to method 26 (step 48). This can provide a build score for each evaluated coordinate axis, as discussed above. The computer may then evaluate the digital model based on one or more secondary criteria, such as support material volume, build time, part strength, post-build processing time (e.g., support removal time), overall processing time, cost, and the like (step 50). This preferably provides one or more secondary-criteria results for each coordinate axis build score.

The computer can then compare the secondary-criteria results to minimum acceptable thresholds to eliminate any part orientations that are unacceptable for the given secondary criteria (step 52). For example, if the digital model is also evaluated for part strength, the computer can compare the part strength results for each coordinate axis to a minimum acceptable part strength threshold. If any part orientations have part strengths below this threshold, they can be eliminated from the available part orientations, regardless of their respective build scores.

The computer can then select the part orientation corresponding to the highest build score from the remaining orientations, and then orient the digital model such that the coordinate axis with the selected highest build score is set at a new printing z-axis, pursuant to step 16 of method 10. As can be seen, method 46 allows the surface-quality evaluation to be supplemented with one or more secondary-criteria evaluations to eliminate part orientations that, while likely to provide good surface quality, are otherwise unacceptable for printing 3D parts.

Figure 7:
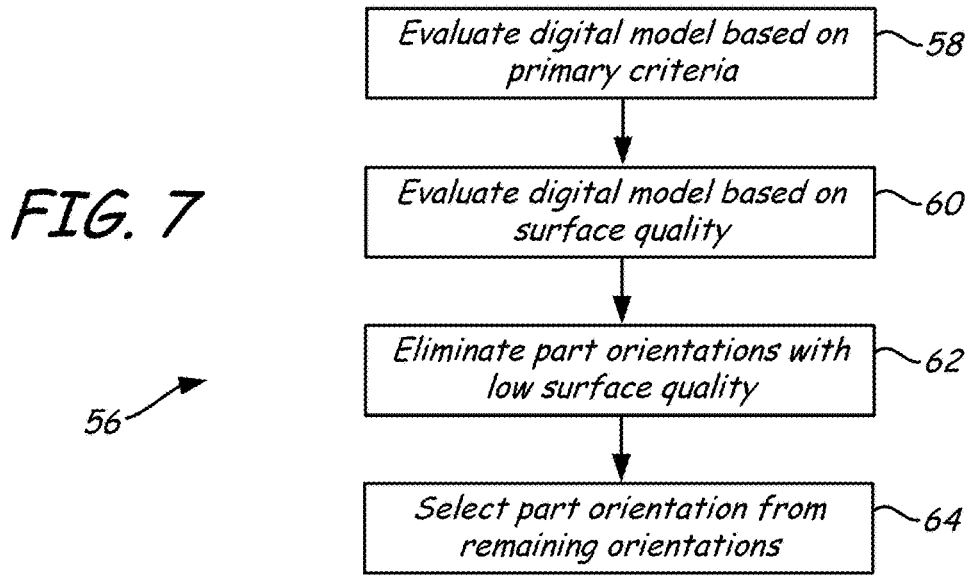
FIG. 7 is a flow diagram of a method for performing the part orientation process based on multiple criteria, where the surface-quality evaluation is a secondary criteria.

FIG. 7 illustrates method 56, which is the reverse situation from method 46, where the surface-quality evaluation is a secondary criteria. As shown, method 56 may initially involve evaluating a digital model based on one or more primary criteria, such as support material volume, build time, part strength, post-build processing time (e.g., support removal time), overall processing time, cost, and the like (step 58). This can provide primary-criteria results for each orientation evaluated (e.g., based on each coordinate axis).

From there, the digital model can also be evaluated for surface quality pursuant to method 26 (shown in FIG. 2), thereby providing build scores for each coordinate axis evaluated (step 60). The computer can then compare the build scores to a minimum acceptable surface quality threshold, where build scores below this threshold are associated with surface qualities that are too low to be acceptable. For instance, the minimum acceptable threshold may correspond to a build score of about 0.6, about 0.7, about 0.8, and/or about 0.9, depending on the particular application.

If any of the part orientations have build scores below this threshold, the computer can eliminate these part orientations from being selected, regardless of the primary-criteria results (step 62). If desired, steps 60 and 62 can optionally be repeated for one or more additional secondary criteria (e.g., part strength) to further eliminate unacceptable orientations. The computer can then select the preferred part orientation from the remaining orientations based on the primary-criteria results (step 64).

The following examples in Tables 2-4 are used to explain the application of method 56 with support material volume as the primary criteria and the surface quality as the secondary criteria. A preferred technique for determining the support material volume includes the technique discussed in Nehme et al., U.S. Pat. No. 8,818,544. The results obtained from this operation can provide support material volumes (and expected build times and associated price quotes) for six orientations (as an example), where the six orientations can be based on the positive and negative directions of the x-axis, y-axis, and z-axis.

Table 2 below lists example support material volumes obtained from a support material volume calculation for the six example orientations, as well as corresponding build scores obtained from the surface-quality evaluation of method 26.

TABLE 2

| Orientation | Support Material Volume (primary criteria) | Surface Quality Build Score (secondary criteria) |
| --- | --- | --- |
| Orientation 1 | 55 | 0.568 |
| Orientation 2 | 10 | 0.568 |
| Orientation 3 | 42 | 0.997 |
| Orientation 4 | 70 | 0.997 |
| Orientation 5 | 21 | 0.925 |
| Orientation 6 | 37 | 0.925 |

As shown in Table 2, Orientation 2 provides the lowest support material volume. However, Orientations 1 and 2 are likely to produce 3D parts having relatively low surface qualities, as illustrated by their low build scores. As such, the computer may compare the build scores (secondary criteria) to a preset acceptable surface quality threshold, such as a build score value of 0.6, for example. In this case, the computer can eliminate Orientations 1 and 2 since they fall below the acceptable surface quality threshold. The computer may then select the preferred part orientation based on the remaining available part orientations, which, in this case is Orientation 5, and orient the digital model accordingly.

Alternatively (or additionally), the surface-quality evaluation can be used as a tie breaker between two or more orientations that are otherwise equal based on their primary criteria results. Table 3 below lists another example support material volumes obtained from a support material volume calculation for the six example orientations, as well as corresponding build scores obtained from the surface-quality evaluation of the present disclosure.

TABLE 3

| Orientation | Support Material Volume (primary criteria) | Surface Quality Build Score (secondary criteria) |
|---|---|---|
| Orientation 1 | 55 | 0.722 |
| Orientation 2 | 10 | 0.722 |
| Orientation 3 | 42 | 0.997 |
| Orientation 4 | 70 | 0.997 |
| Orientation 5 | 10 | 0.925 |
| Orientation 6 | 37 | 0.925 |

As shown in Table 3, Orientations 2 and 5 each provide the same lowest support material volume. As such, the computer may then compare the build scores (secondary criteria) for Orientations 2 and 5 to see which orientation is likely to provide a better surface quality. In this case, Orientation 5 has a significantly better build score compared to Orientation 2. The computer may then identify Orientation 5 as the preferred part orientation, and orient the digital model accordingly.

Other variations of these examples can also be applied. For instance, each criteria may be assigned a weighted value depending on its relative importance, and the weighted criteria may then be balanced to identify the best overall part orientation for printing. This can be useful in situations where two or more orientations have similar (but different) values under a primary criteria, but have significantly different surface quality build scores. Table 4 below lists yet another example support material volumes obtained from a support material volume calculation for the six example orientations, as well as corresponding build scores obtained from the surface-quality evaluation of the present disclosure.

TABLE 4

| Orientation | Support Material Volume (primary criteria) | Surface Quality Build Score (secondary criteria) |
|---|---|---|
| Orientation 1 | 55 | 0.722 |
| Orientation 2 | 10 | 0.722 |
| Orientation 3 | 42 | 0.997 |
| Orientation 4 | 70 | 0.997 |
| Orientation 5 | 12 | 0.925 |
| Orientation 6 | 37 | 0.925 |

As shown in Table 4, the Orientation 2 provides the lowest support material volume, and Orientation 5 provides the second lowest support material volume, which is similar to the lowest, but not the same. In this case, regardless of any reasonable weight ratio between the primary and secondary criteria (e.g., a 10:1 ratio), the small differences between the support material volumes for Orientations 2 and 5 are outweighed by the significant differences between their build scores. As such, the computer may then identify Orientation 5 as the preferred part orientation, and orient the digital model accordingly.

Figure 8:
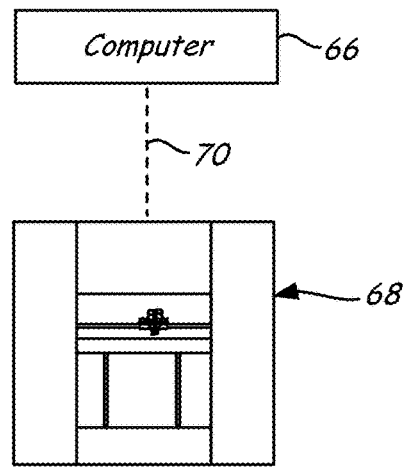
FIG. 8 is a first example system for printing a 3D part using the part orientation process, which includes a stand-alone additive manufacturing system.

The techniques under methods 10, 26, 46, and 56 are suitable for use with any additive manufacturing system or multiple systems (e.g., a farm of additive manufacturing systems). For example, as shown in FIG. 8, the steps of methods 10, 26, 46, and 56 may be performed by a computer 66 that can function as a host computer for a stand-alone, additive manufacturing system 68. For example, computer 66 may communicate with system 68 over one or more communication lines 70. In some aspects, computer 66 may be internal to system 68, such as part of an internal controller assembly for system 68.

Figure 9:
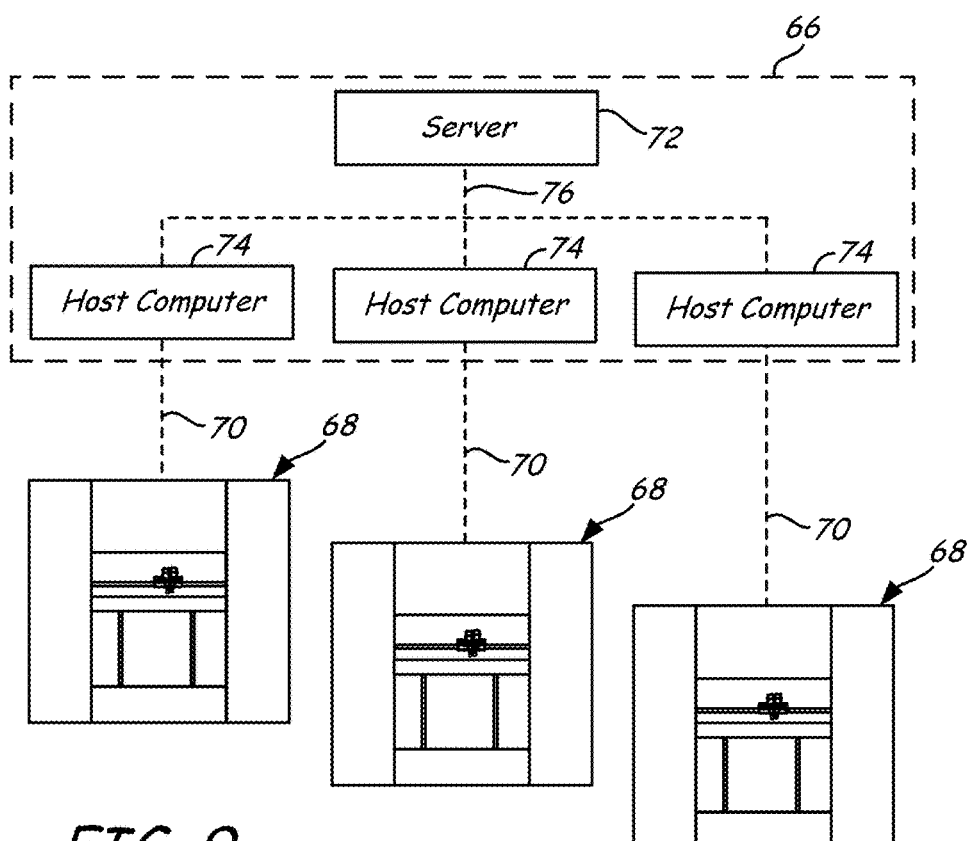
FIG. 9 is a second example system for printing a 3D part using the part orientation process, which includes multiple additive manufacturing systems.

Alternatively, as shown in FIG. 9, computer 66 may function as a local server for multiple additive manufacturing systems 68. For example, systems 68 may be part of an overall production system to manufacture consumer or industrial OEM products. As such, computer 66 and may perform the steps of methods 10, 26, 46, and 56, and may also perform one or more additional processing steps, such as run-time estimates, printer queuing, post-processing queuing, and the like. As shown, computer 66 may optionally include one or more servers 72 and one or more dedicated host computers 74 associated with each system 68, where server 72 may communicate with host computers 74 over one or more communication lines 76 (e.g., network lines).

Figure 10:
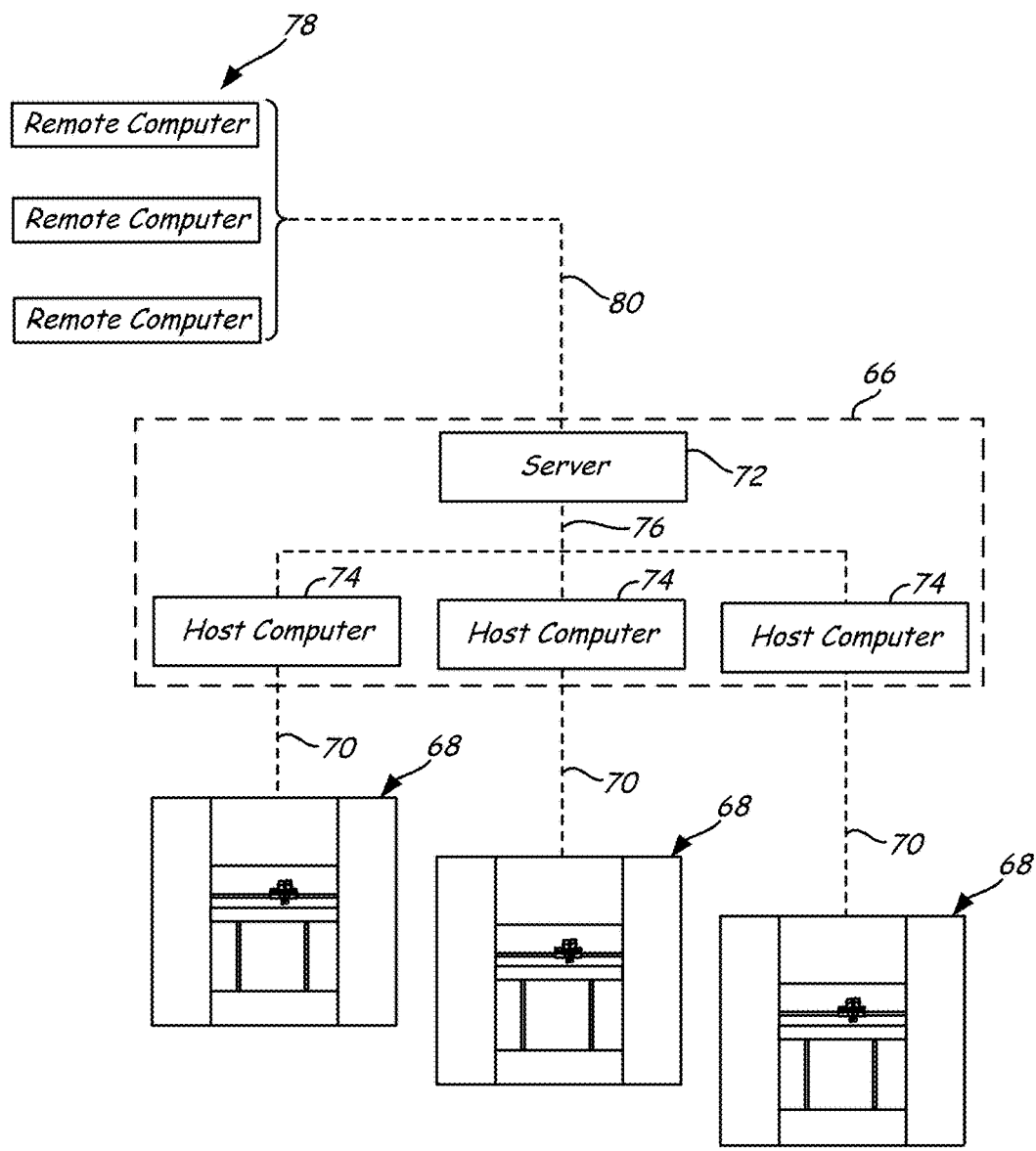
FIG. 10 is a third example system for printing a 3D part using the part orientation process, which includes multiple additive manufacturing systems and a cloud-based server architecture.

In yet another embodiment, as shown in FIG. 10, computer 66 and systems 68 may be part of an on-demand service center. In this embodiment, computer 66 may function as a cloud-based server, for example, where customers may submit digital models (e.g., STL data files) from their personal computers 78 over the Internet via one or more network or communication lines 80 to computer 66 (e.g., to server 72).

In this application, computer 66 may perform the steps of methods 10, 26, 46, and 56, as well as one or more additional processing steps, such as support material volume calculations, price quoting, run-time estimates, printer queuing, post-processing queuing, shipping estimates, and the like. For example, in some embodiments, computer 66 may generate support material volume calculations, build times, and price quoting as discussed in Nehme et al., U.S. Pat. No. 8,818,544. The service center may also include one or more post-printing stations (e.g., support removal stations, surface finishing stations, shipping stations, and the like, not shown), where computer 66 may also optionally communicate with the post-printing station(s).

The following discussion of the evaluation process of the present disclosure is made with reference to computer 66 with the understanding that the steps of the evaluation process can be performed by a single computer system or collectively by multiple computer systems, as is understood by those skilled in the art. As such, as used herein, the term "computer" refers to one or more computer systems, such as one or more personal computers, laptop computers, local servers, cloud-based servers, mobile media devices, computer tablet devices, and the like.

Figure 11:
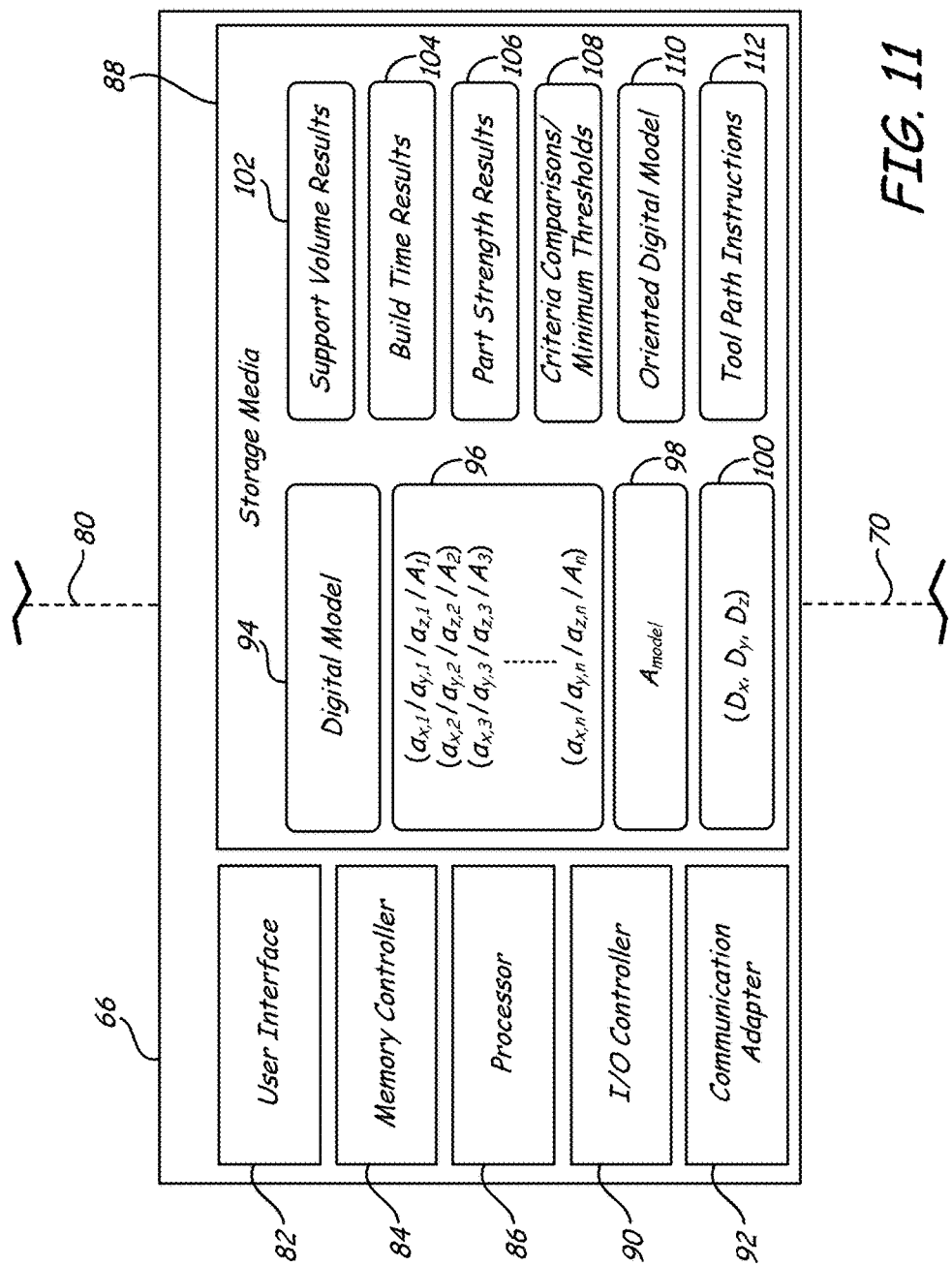
FIG. 11 is a block diagram of an example computer architecture for use in the examples systems shown in FIGS. 8-10.

FIG. 11 illustrates an example architecture for computer 66. As shown, computer 66 may include any suitable computer-based hardware, such as user interface 82, memory controller 84, processor 86, storage media 88, input/output (I/O) controller 90, and communication adapter 92. Computer 66 may also include a variety of additional components that are contained in conventional computers, servers, media devices, signal processing devices, and/or printer controllers.

User interface 82 is one or more user-operated interfaces (e.g., keyboards, touch pads, touch-screen displays, display monitors, and other eye, voice, movement, or hand-operated controls) configured to operate computer 66. Memory controller 84 is one or more circuit assemblies that interface the components of computer 66 with one or more volatile random access memory (RAM) modules of storage media 88. Processor 86 is one or more computer-processing units configured to operate computer 66, optionally with memory controller 84, and preferably with related processing circuitry (e.g., programmable gate arrays, digital and analog components, and the like). For instance, processor 86 may include one or more microprocessor-based and/or microcontroller-based units, one or more central processing units, and/or one or more front-end processing units.

Storage media 88 is one or more internal and/or external data storage devices or computer storage media for computer 66, such as volatile RAM modules, read-only memory modules, optical media, magnetic media (e.g., hard disc drives), solid-state media (e.g., FLASH memory and solid-state drives), analog media, and the like. Storage media 88 may retain one or more pre-processing and/or post-processing programs (not shown), such as for performing steps 12-22 of method 10.

I/O controller 90 is one or more circuit assemblies that interface memory controller 84, processor 86, and storage media 88 with various input and output components of computer 66, including user interface 82 and communication adapter 92. Communication adapter 92 is one or more wired and/or wireless transmitter/receiver adapters configured to communicate over communication lines 70 and 80.

The commands from computer 66 to the components of systems 68 may be performed with one or more of user interface 82, memory controller 84, processor 86, storage media 88, input/output (I/O) controller 90, communication adapter 92, and/or other suitable hardware and software implementations, as is understood by those skilled in the art.

During use, storage media 88 may receive and retain one or more data files of digital models to be printed with system(s) 68, such as digital model 94. As discussed above, the data file for digital model 94 preferably includes multiple facets that describe its surface geometry. Each facet includes a normal vector $\hat{N}$ that is a unit vector (i.e., a length or magnitude of 1, within numerical tolerances), and, in a Cartesian coordinate system, has three coordinate components as described by the following expression:

$$\hat{N} = N_x \hat{e}_x + N_y \hat{e}_y + N_z \hat{e}_z \qquad \text{(Equation 10)}$$

Each normal vector also preferably allows for the orientation of the facet plane to be determined along any axis $\hat{e}_p$ as described by the following expression:

$$\cos \alpha_p = \hat{N} \hat{e}_p \qquad \text{(Equation 11)}$$

Furthermore, the angle between the normal vector of the facet and each coordinate axis can be described by the following expressions:

$$\alpha_x = \text{abs}(a \cos(\hat{N}\hat{e}_x)) = \text{abs}(a \cos(N_x)) \qquad \text{(Equation 12)}$$

$$\alpha_y = \text{abs}(a \cos(\hat{N}\hat{e}_y)) = \text{abs}(a \cos(N_y)) \qquad \text{(Equation 13)}$$

$$\alpha_z = \text{abs}(a \cos(\hat{N}\hat{e}_z)) = \text{abs}(a \cos(N_z)) \qquad \text{(Equation 14)}$$

where "abs" refers to the absolute value of the resulting angles to ignore the positive or negative directions of the angles, as discussed above. For example, assuming $N_x$ is 0.2857, $N_y$ is 0.4286, and $N_z$ is 0.857, the length of the normal vector is 1 (within numerical tolerances), and the angle $\alpha_x$ between the normal vector of the facet and the x-axis is 1.2811 radians, the angle $\alpha_y$ between the normal vector of the facet and the y-axis is 1.1279 radians, and the angle $\alpha_z$ between the normal vector of the facet and the z-axis is 0.5412 radians. As also discussed above, in some preferred embodiments, zero degree or radian angles may be replaced with a minimum angle value (e.g., 0.010 radians) to avoid subsequent potential computation errors.

Accordingly, pursuant to step 30 of method 26, computer 66 may determine the facet plane angle relative to each coordinate axis for digital model 94, which is preferably performed for each facet of digital model 94. As discussed above, the normal vectors for each facet may be extracted from the STL data file and/or calculated based on their vertex coordinate locations. Each facet includes at least three vertices, where a triangular facet has three vertices with endpoints that are preferably ordered to imply the unit normal vector, and which may be described by the following expression:

$$\overline{V}_m = V_{x,m} \hat{e}_x + V_{y,m} \hat{e}_y + V_{z,m} \hat{e}_z \qquad \text{(Equation 15)}$$

where "m" is the vertex number (e.g., 1, 2, or 3 for a triangular facet). This also preferably implies that the cross product of two sides of any facet crossed by the facet normal should product a zero-length vector (within numerical tolerances). For instance, Equation 15 for a triangular facet of digital model 94 can be described by the following example expression set:

$$\overline{V}_1 = 3\hat{e}_x + 0\hat{e}_y + 0\hat{e}_z$$

$$\overline{V}_2 = 0\hat{e}_x + 2\hat{e}_y + 0\hat{e}_z$$

$$\overline{V}_3 = 0\hat{e}_x + 0\hat{e}_y + 1\hat{e}_z \qquad \text{(Equation 16)}$$

As such, computer 66 may determine the plane angle for each facet relative to each coordinate axis for digital model 94 from the vertex coordinate locations of the facet (and/or from the normal vector data in the STL data file). This provides the plane angles $(\alpha_{x,i}/\alpha_{y,i}/\alpha_{z,i})$, $(\alpha_{x,i+1}/\alpha_{y,i+1}/\alpha_{z,i+1})$, $(\alpha_{x,i+2}/\alpha_{y,i+2}/\alpha_{z,i+2})$, ... $(\alpha_{x,n}/\alpha_{y,n}/\alpha_{z,n})$ for "n" total facets in digital model 94.

Additionally, pursuant to step 28 of method 26, computer 66 may also determine the surface area of each facet in digital model 94. For example, computer 66 may refer to the coordinate locations of each facet vertex, and may calculate the surface area of a given vertex using the following expressions:

$$a^2 = \|V_2 - V_1\|^2 = (V_{x,2} - V_{x,1})^2 + (V_{y,2} - V_{y,1})^2 + (V_{z,2} - V_{z,1})^2 \qquad \text{(Equation 17)}$$

$$b^2 = \|V_3 - V_2\|^2 = (V_{x,3} - V_{x,2})^2 + (V_{y,3} - V_{y,2})^2 + (V_{z,3} - V_{z,2})^2 \qquad \text{(Equation 18)}$$

$$c^2 = \|V_1 - V_3\|^2 = (V_{x,1} - V_{x,3})^2 + (V_{y,1} - V_{y,3})^2 + (V_{z,1} - V_{z,3})^2 \qquad \text{(Equation 19)}$$

$$[r^2 s^2 t^2] = \text{sort}d[a^2 b^2 c^2] \qquad \text{(Equation 20)}$$

where $[r^2\ s^2\ t^2]$ in Equation 19 is the array $[a^2\ b^2\ c^2]$ sorted in descending order such that $a^2 \geq b^2 \geq c^2$. Using the sorted values from Equations 17-20, the surface area may then be calculated by the following expression:

$$A = 0.25 \sqrt{4r^2 s^2 - (r^2 - s^2 - t^2)^2} \qquad \text{(Equation 21)}$$

Applying Equations 17-21 to the vertices of each facet provides the surface areas $A_i, A_{i+1}, A_{i+2}, \ldots A_n$ for "n" total facets in digital model 94, and may also provide the total surface area of digital model 94, $A_{model}$, which is the sum of the facet surface areas $A_i, A_{i+1}, A_{i+2}, \ldots A_n$. Following the example vertices described in Equation 16 to the expressions in Equations 17-21 provides the following:

$$a^2 = (-3)^2 + (2)^2 + (0)^2 = 13$$

$$b^2 = (0)^2 + (-2)^2 + (1)^2 = 5$$

$$c^2 = (3)^2 + (0)^2 + (2)^2 = 10$$

$$[r^2 s^2 t^2] = \text{sort}d[13\ 5\ 10] = [13\ 10\ 5]$$

$$A = 0.25 \sqrt{4*13*10 - (13-10-5)^2} = 3.5 \qquad \text{(Equation 22)}$$

Hence, the example facet having the vertices described in Equation 16 has a surface area of 3.5 units. Computer 66 may then save the resulting facet data sets $(\alpha_{x,i}/\alpha_{y,i}/\alpha_{z,i}/A_i)$, $(\alpha_{x,i+1}/\alpha_{y,i+1}/\alpha_{z,i+1}/A_{i+1})$, $(\alpha_{x,i+2}/\alpha_{y,i+2}/\alpha_{z,i+2}/A_{i+2})$, ...

($\alpha_{x,n}/\alpha_{y,n}/\alpha_{z,n}/A_n$), and the total surface area $A_{model}$ for digital model 94 on storage media 88 as one or more data files 96 and 98.

From there, computer 66 may calculate the build score for each coordinate axis, $D_x$, $D_y$, $D_z$, following one or more of Equations 1-9, as discussed above for step 32 of method 26. Computer 66 may then save the resulting build scores on storage media 88 as one or more data files 100.

In embodiments in which computer 44 also evaluates digital model 94 based on other criteria, such as support material volume, build time, part strength, and the like, the results of these evaluation results can also be saved on storage media 88, such as under one or more data files 102, 104, and 106 (and/or data files for any other criteria evaluated). Moreover, values and functions for comparing the multiple criteria, such as minimum surface quality thresholds, other minimum criteria thresholds, criteria weights or relative weights, and the like may also be stored on storage media 88 as one or more data files 108. During operation, computer 66 may refer to the information in data files 108 when comparing the multiple criteria (e.g., under step 52 of method 46 or under step 62 of method 56).

After digital model 94 is oriented based on the evaluation(s), the oriented digital model may also be saved on storage media 88 as one or more data files 110, which may replace the data file(s) for digital model 94 or be separate data file(s). In some embodiments, data files 110 may also include one or more graphical representations of the oriented digital model 94. For example, as discussed above, in some embodiments, the build scores and/or individual facet scores may be displayed graphically, such as with colored images or other digital representations of digital model 94 (e.g., green for a high facet scores and red for a low facet scores).

Then, pursuant to steps 18-22 of method 10, computer 66 can slice the oriented digital model into multiple sliced layers, generate supports, and generate tool path instructions. This data may then be saved to storage media 88 as one or more data files 112. Computer 66 may then transmit data files 112 to one or more systems 68 (e.g., via communication lines 70) to print one or more 3D parts (and any associated support structures) based on the oriented digital model.

Figure 12:
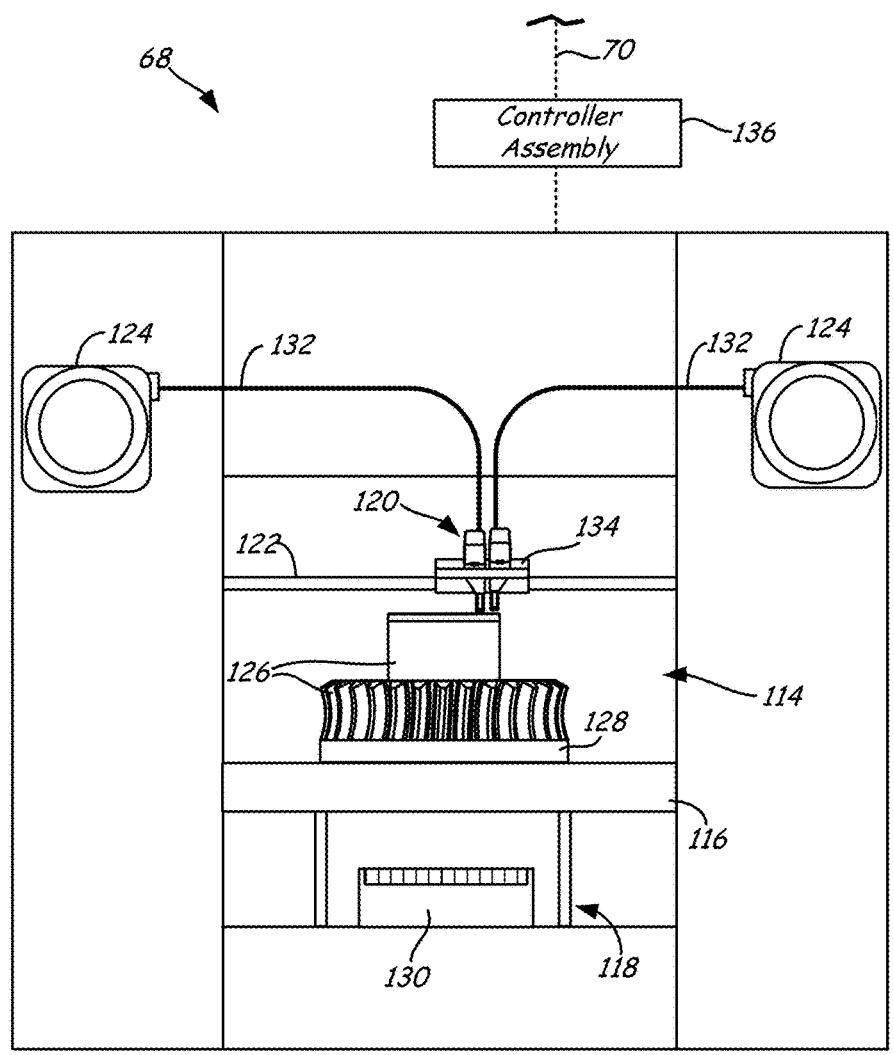
FIG. 12 is a front view of an example additive manufacturing system configured to print 3D parts and support structures, for use in the examples systems shown in FIGS. 8-10.
Figure 13:
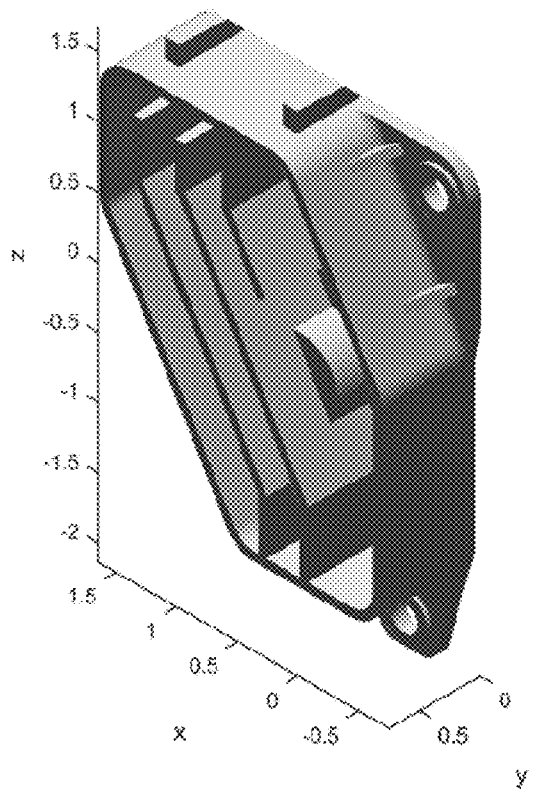
Figure 14:
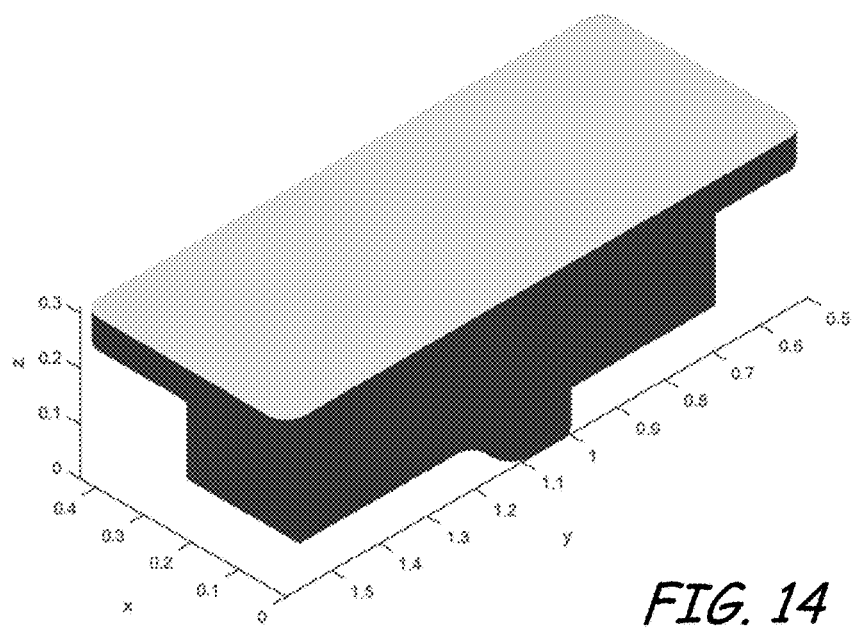
Figure 15:
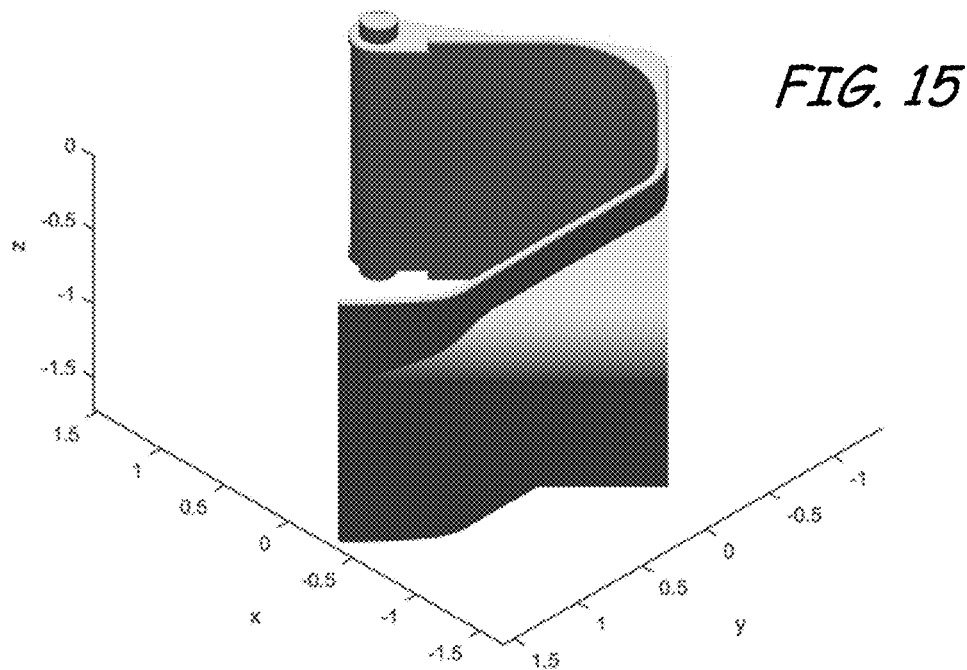
Figure 16:
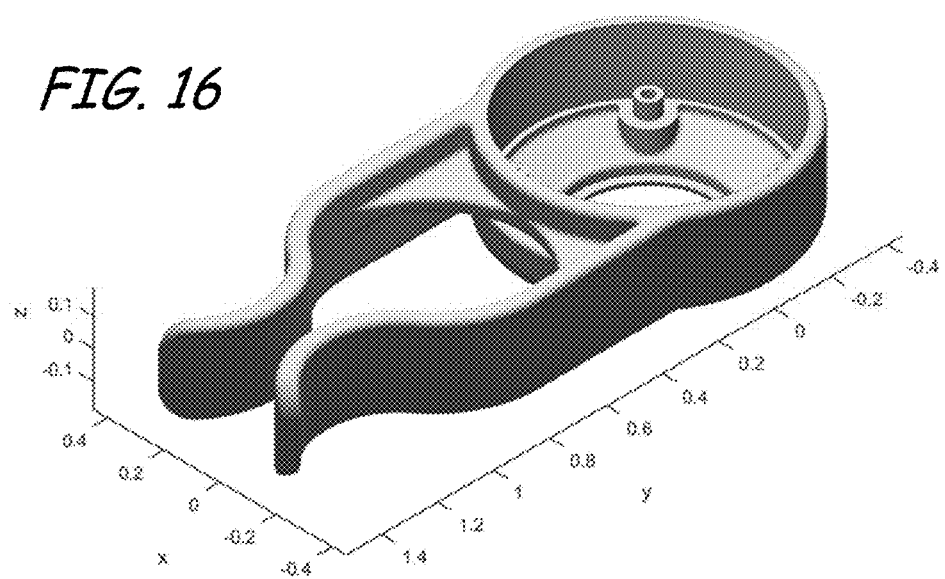
Figure 17:
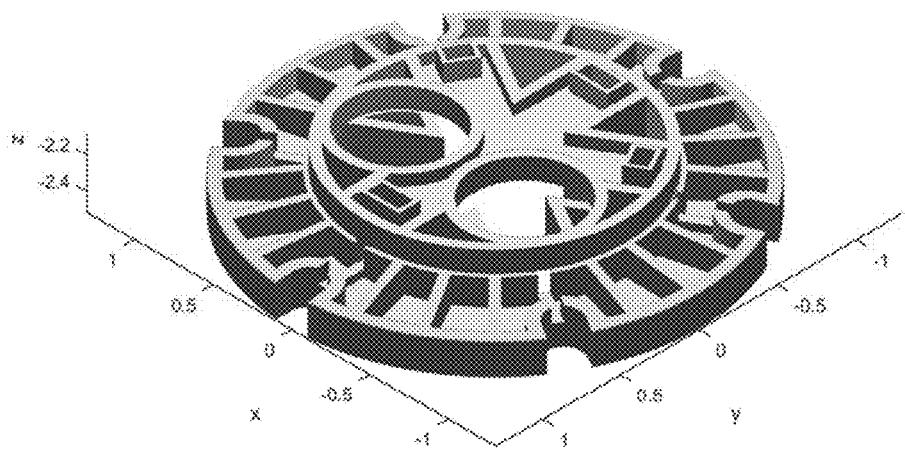
Figure 18:
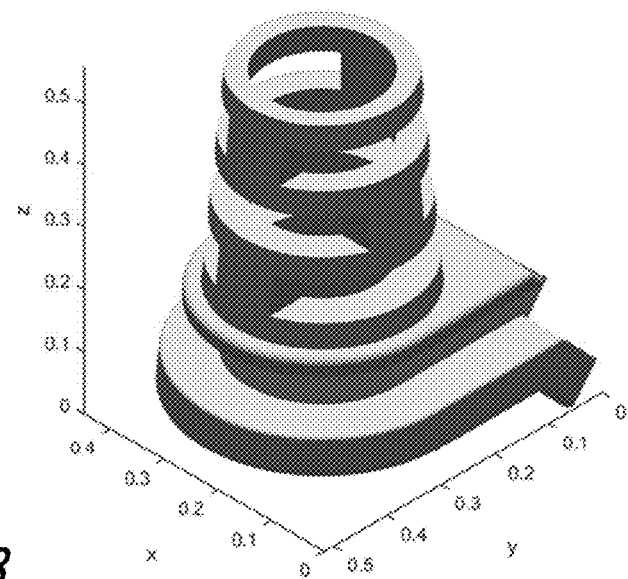
Figure 19:
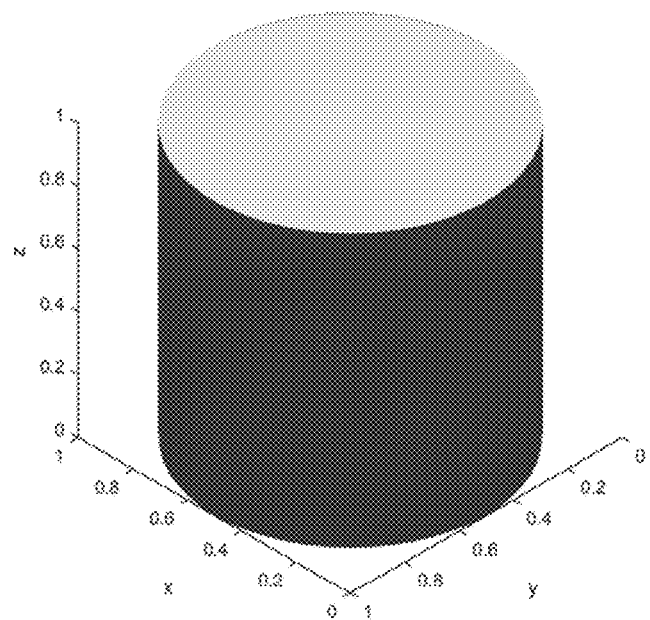
Figure 20:
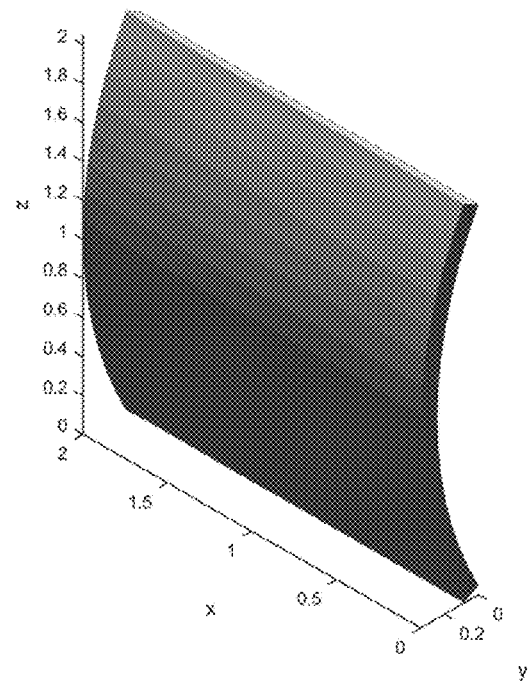

FIG. 12 illustrates an example system 68 for printing or otherwise building 3D parts and support structures using a layer-based, additive manufacturing technique based on an oriented digital model (e.g., the oriented digital model in data files 110). Suitable additive manufacturing systems for system 68 include fused deposition modeling systems developed by Stratasys, Inc., Eden Prairie, Minn. under the trademarks "FDM". Alternatively, system 10 may be any suitable additive manufacturing system, such as those based on extrusion-based techniques, jetting, selective laser sintering, powder/binder jetting, electron-beam melting, digital light processing (DLP), stereolithography, selective laser melting, direct laser metal sintering, and electrostatographic processes.

In the shown example, system 68 includes chamber 114, platen 116, platen gantry 118, one or more print heads 120, head gantry 122, and consumable assemblies 124. Chamber 114 is an example build environment that contains platen 116 for printing 3D part 126 and support structure 128 (based on the oriented digital model and tool path instructions in data files 110 and 112), where chamber 114 may be may be optionally omitted and/or replaced with different types of build environments. For example, 3D part 126 and support structure 128 may be built in a build environment that is open to ambient conditions or may be enclosed with alternative structures (e.g., flexible curtains).

In the shown example, the interior volume of chamber 114 may be heated with heater 130 to reduce the rate at which the part and support materials solidify after being extruded and deposited (e.g., to reduce distortions and curling). Heater 130 may be any suitable device or assembly for heating the interior volume of chamber 114, such as by radiant heating and/or by circulating heated air or other gas (e.g., inert gases). In alternative embodiments, heater 130 may be replaced with other conditioning devices, such as a cooling unit to generate and circulate cooling air or other gas. The particular thermal conditions for the build environment may vary depending on the particular consumable materials used.

Platen 116 is a platform on which 3D part 126 and support structure 128 are printed in a layer-by-layer manner, and is supported by platen gantry 118. In some embodiments, platen 116 may engage and support a build substrate, which may be a tray substrate as disclosed in Dunn et al., U.S. Pat. No. 7,127,309; may be fabricated from plastic, corrugated cardboard, or other suitable material; and may also include a flexible polymeric film or liner, painter's tape, polyimide tape, adhesive laminate (e.g., an applied glue), or other disposable fabrication for adhering deposited material onto the platen 116 or onto the build substrate. In some embodiments, platen 116 and/or the build substrate may be heated, such as with one or more electrically-resistive heating elements.

Platen gantry 118 is a gantry assembly configured to move platen 116 along (or substantially along) the printing z-axis (e.g., a vertical printing z-axis), which, as discussed above, can be the coordinate axis that is associated with the highest build score. Platen gantry 118 may operate with one or more motors (e.g., stepper motors and encoded DC motors), gears, pulleys, belts, screws, robotic arms, and the like.

Print heads 120 are one or more extrusion or deposition heads configured to receive consumable filaments from consumable assemblies 124 (e.g., via guide tubes 132 and 132) for printing 3D part 126 and support structure 128 on platen 116. Print heads 120 may optionally be retained by head gantry 122 with a carriage 134. Carriage 134 preferably retains each print head 120 in a manner that prevents or restricts movement of the print head 120 relative to carriage 134 in the x-y build plane, but allows the print head 120 to be controllably moved out of the x-y build plane (e.g., servoed, toggled, or otherwise switched in a linear or pivoting manner).

Examples of suitable devices for print heads 120, and the connections between print heads 120, head gantry 122, and carriage 134 include those disclosed in Crump et al., U.S. Pat. No. 5,503,785; Swanson et al., U.S. Pat. No. 6,004,124; LaBossiere, et al., U.S. Pat. Nos. 7,384,255 and 7,604,470; Leavitt, U.S. Pat. No. 7,625,200; Batchelder et al., U.S. Pat. No. 7,896,209; and Comb et al., U.S. Pat. No. 8,153,182. In some embodiments, print heads 120 are each interchangeable, single-nozzle print head, examples of suitable devices for each print head 120, and the connections between print head 120, head gantry 122, and carriage 134 include those disclosed in Swanson et al., U.S. Pat. No. 8,419,996. In these embodiments, print heads 120 may be removably interchanged from carriage 134, such as with snap-fit mechanisms.

In the shown embodiment, head gantry 122 is a robotic mechanism configured to move carriage 134 (and the retained print heads 120) parallel to (or substantially parallel to) a horizontal x-y build plane above platen 116. Examples of suitable gantry assemblies for head gantry 122 include those disclosed in Swanson et al., U.S. Pat. No. 6,722,872; and Comb et al., U.S. Publication No. 2013/0078073, where head gantry 122 may also support deformable baffles (not shown) that define a ceiling for chamber 114. While illustrated as a bridge-type gantry, head gantry 122 may utilize any suitable robotic mechanism for moving carriage 134 (and the retained print heads 120), such as with one or more motors (e.g., stepper motors and encoded DC motors), gears, pulleys, belts, screws, robotic arms, and the like.

In some alternative embodiments, platen 116 may be configured to move in the horizontal x-y plane within chamber 114, and carriage 134 (and print heads 120) may be configured to move along the z-axis. Other similar arrangements may also be used such that one or both of platen 116 and print heads 120 are moveable relative to each other. Platen 116 and carriage 134 (and print heads 120) may also be oriented along different axes. For example, platen 116 may be oriented vertically and print heads 120 may print 3D part 126 and support structure 128 along the x-axis or the y-axis. In another example, platen 116 and/or carriage 134 (and print heads 120) may be moved relative to each other in a non-Cartesian coordinate system, such as in a polar coordinate system.

Consumable assemblies 124 may contain supplies of part and support materials for printing 3D part 126 and support structure 128, and each may include an easily loadable, removable, and replaceable container device. Each consumable assembly 124 may retain the consumable filament on a wound spool, a spool-less coil, or other supply arrangement, such as discussed in Swanson et al., U.S. Pat. No. 7,374,712; Taatjes at al., U.S. Pat. No. 7,938,356; Mannella et al., U.S. Publication Nos. 2013/0161432 and 2013/0161442; and Batchelder et al., U.S. Publication No. 2014/0158802. Consumable assemblies 124 may include any suitable media type, such as filaments, powders, pellets, slugs, and the like. For instance, in embodiments in which the consumable materials are provided in powder form, container portions 22 may be replaced with one or more hoppers, such as discussed in Bosveld et al., U.S. Publication No. 2013/0333798.

System 68 may also include controller 136, which is one or more computer-based systems and/or controller circuits configured to operate the components of system 68, such as based on the tool path instructions (in data files 112) received from computer 66. During a printing operation, controller 136 may command platen gantry 118 to move platen 116 to a predetermined height within chamber 114. Controller 136 may then command head gantry 122 to move carriage 134 (and the retained print heads 120) around in the horizontal x-y plane above chamber 114. Controller 136 may also command print heads 120 to selectively draw successive segments of the consumable filaments (or other consumable materials) from consumable assemblies 124 and through guide tubes 132.

The successive segments of each consumable filament are then melted in a liquefier assembly of the respective print head 120 to produce a molten material. The downward movement of the filament functions as a viscosity pump to extrude the molten material as an extrudate. Upon exiting print head 120, the resulting extrudate may be deposited onto platen 116 as a series of roads for printing 3D part 124 or support structure 126 in a layer-by-layer manner. For example, 3D part 124 or support structure 126 may be printed or otherwise built in three dimensions by producing successive layers of the deposited roads in two-dimensional, cross-sectional patterns stacked on top of each other. After the print operation is complete, the resulting 3D part 126 and support structure 128 may be removed from chamber 114, and support structure 128 may be removed from 3D part 126. 3D part 126 may then undergo one or more additional post-processing steps, as desired.

The resulting 3D part 126 is accordingly oriented in the same direction as digital model 94. Based on the surface-quality evaluation of the present disclosure, the surfaces of 3D part 126 are preferably aligned as close as possible to the printing z-axis or to the x-y build plane of system 68. In other words, any sloped surfaces of 3D part 126 are preferably minimized to reduce or eliminate the formation of stair-step features. This can significantly improve the surface quality of 3D part 126 for use in many applications.

EXAMPLES

The present disclosure is more particularly described in the following examples that are intended as illustrations only, since numerous modifications and variations within the scope of the present disclosure will be apparent to those skilled in the art.

Surface-quality evaluations, pursuant to method 26 (shown in FIG. 2), were performed on digital models for Examples 1-10, which are respectively shown in FIGS. 13-22. The evaluations were performed using Equations 6-15 and 17-21 and resulted in build scores for each coordinate axis (i.e., the x-axis, y-axis, and z-axis). Table 5 below lists the corresponding Figure, build scores, and identified printing axis for each of Examples 1-10. The identified printing axis is the axis corresponding to the highest build score, and is the axis that is predicted to most likely provide the best surface quality.

TABLE 5

| Example | Figure | $D_x$ | $D_y$ | $D_z$ | Printing Axis |
| --- | --- | --- | --- | --- | --- |
| Example 1 | 13 | 0.576 | 0.988 | 0.776 | y-axis |
| Example 2 | 14 | 0.983 | 0.981 | 0.999 | z-axis |
| Example 3 | 15 | 0.627 | 0.600 | 0.928 | z-axis |
| Example 4 | 16 | 0.615 | 0.728 | 0.836 | z-axis |
| Example 5 | 17 | 0.744 | 0.726 | 0.944 | z-axis |
| Example 6 | 18 | 0.743 | 0.735 | 0.902 | z-axis |
| Example 7 | 19 | 0.667 | 0.667 | 1.000 | z-axis |
| Example 8 | 20 | 1.000 | 0.217 | 0.828 | x-axis |
| Example 9 | 21 | 0.637 | 0.637 | 0.637 | any axis |
| Example 10 | 22 | 0.710 | 0.710 | 0.500 | x-axis or y-axis |

As shown in Table 5 and FIGS. 13-22, the build scores and identified printing axes are capable of predicting the part orientations that are most likely provide the best surface quality. For example, the cylinder-shaped model in FIG. 19 will typically have the best surface quality when the cylinder ends are aligned in the horizontal x-y plane, as shown.

The one exception to the build score results is the torus-shaped model in FIG. 22. The build scores predict that the torus-shaped model should be oriented such that the x-axis or the y-axis are aligned with the printing axis. However, for best surface quality, a torus-shaped model is typically oriented such that the z-axis is aligned with the printing axis. This illustrates a situation where the surface-quality rules may not apply. However, as shown in FIGS. 13-21, for the majority of digital model geometries, the surface-quality evaluation of method 26 is capable of accurately predicting which part orientations are likely provide good surface quality. This is particularly beneficial for digital models having surface geometries that are complex (e.g., Examples 1-6 as shown in FIGS. 13-18), making it difficult or impossible for a person to intuitively ascertain which orientation will provide the best surface quality.

Although the present disclosure has been described with reference to preferred embodiments, workers skilled in the art will recognize that changes may be made in form and detail without departing from the spirit and scope of the disclosure.

The invention claimed is:

1. A method for printing a three-dimensional part in an additive manufacturing process, the method comprising:
   receiving a digital model of the three-dimensional part to a computer, wherein the digital model is provided in a coordinate system having a plurality of coordinate axes, and has a surface geometry, wherein the surface geometry comprises a plurality of facets having surfaces;
   determining a surface area for each of the plurality of facets;
   calculating surface plane angles normal to each of the surfaces for each of the plurality of facets relative to one or more of the coordinate axes with the computer;
   calculating a build score for each of the one or more coordinate axes with the computer, wherein the build score is calculated as a function of the calculated surface plane angles for each of the plurality of facets;
   selecting an orientation for the digital model in the coordinate system based at least in part on the calculated build scores; and
   outputting the digital model with the selected orientation of the digital model to an additive manufacturing system.

2. The method of claim 1, wherein selecting the orientation for the digital model in the coordinate system based at least in part on the calculated build scores comprises orienting the digital model such that a coordinate axis corresponding to a highest build score is aligned with a printing axis for the additive manufacturing process.

3. The method of claim 1, and further comprising determining one or more additional criteria results for each of the one or more coordinate axes with the computer.

4. The method of claim 3, and further comprising:
   comparing the calculated build scores to a threshold value, with the computer, to identify any coordinate axis having a calculated build score that is below the threshold value; and
   eliminating, with the computer, any of the identified coordinate axes from available selections for orienting the digital model in the coordinate system.

5. The method of claim 3, wherein the one or more additional criteria results are based on one or more criteria comprising support material volume, build time, part strength, support removal time, or combinations thereof.

6. The method of claim 1, and further comprising printing the three-dimensional part with the additive manufacturing system based on the oriented digital model.

7. The method of claim 1, wherein the calculated build score for each coordinate axis is based on:

$$D_p = \frac{\oint \alpha_p dA}{R}$$

wherein $D_p$ is the calculated build score for coordinate axis p;

wherein $\oint \alpha_p dA$ is the calculated surface plane angles relative to the coordinate axis p as a function of the surface area of the surface geometry; and wherein R is an optional normalizing value.

8. A method for printing a three-dimensional part in an additive manufacturing process, the method comprising:
   receiving a digital model of the three-dimensional part to a computer, wherein the digital model has a surface defined by a plurality of facets;
   calculating a surface area for each of the facets, with the computer, based on facet vertices;
   calculating a plane angle that is substantially normal to the surface for each of the facets relative to each of a plurality of coordinate axes in a coordinate system with the computer;
   calculating a build score for each coordinate axis, with the computer, as a function of the calculated surface areas and the calculated plane angles;
   selecting an orientation for the digital model in the coordinate system based at least in part on the calculated build scores and
   outputting the digital model with the selected orientation of the digital model to an additive manufacturing system.

9. The method of claim 8, wherein selecting an orientation for the digital model in the coordinate system based at least in part on the calculated build scores comprises orienting the digital model such that a coordinate axis corresponding to a highest build score is aligned with a printing axis for the additive manufacturing process.

10. The method of claim 8, wherein the coordinate system is a Cartesian coordinate system, and wherein the plurality of coordinate axes comprise an x-axis, a y-axis, and a z-axis of the Cartesian coordinate system.

11. The method of claim 8, wherein the calculated build score for each coordinate axis is based on:

$$D_p = \frac{\sum_i^n \alpha_{p,i} A_i}{R}$$

wherein $D_p$ is the calculated build score for coordinate axis p;
wherein $\alpha_{p,i}$ is the calculated plane angle for facet i relative to the coordinate axis p;
wherein $A_i$ is the calculated surface area for the facet i;
wherein R is an optional normalizing value; and
wherein n is a total number of the plurality of facets.

12. The method of claim 8, wherein the calculated build score for each coordinate axis is based on:

$$D_p = \sum_i^n f\left(\frac{\alpha_{p,i} A_i}{R}\right)$$

wherein $D_p$ is the calculated build score for coordinate axis p;
wherein $\alpha_{p,i} A_i/R$ is a facet score for facet i relative to the coordinate axis p, $\alpha_{p,i}$ is the calculated plane angle for the facet i relative to the coordinate axis p, $A_i$ is the calculated surface area for the facet i, and R is an optional normalizing value;
wherein $f(\alpha_{p,i} A_i/R)$ is a non-linear function of the facet score for facet i relative to the coordinate axis p; and
wherein n is a total number of the plurality of facets.

13. The method of claim 7, and further comprising printing the three-dimensional part with the additive manufacturing system based on the oriented digital model.

14. A method for printing a three-dimensional part in an additive manufacturing process, the method comprising:
   receiving a digital model of the three-dimensional part to a computer, the digital model having a surface defined by a plurality of facets wherein the digital model is provided in a coordinate system having a plurality of coordinate axes;
   calculating surface areas for one or more of the facets of the digital model with the computer;
   calculating plane angles normal to the surface for the one or more facets relative to each of the two or more of the coordinate axes with the computer; and
   calculating a build score for each of the two or more coordinate axes with the computer, wherein the build scores are calculated as a function of the calculated surface areas and the calculated plane angles;
   calculating primary criteria values for two or more of the coordinate axes with the computer, wherein the primary criteria values comprise support material volume, build time, or both;
   evaluating the digital model for surface quality, with the computer, for each of the for two or more of the coordinate axes;
   eliminating any coordinate axis having a surface quality that does not meet a minimum surface quality threshold to provide one or more remaining coordinate axes;
   selecting an orientation for the digital model in the coordinate system from the one or more remaining coordinate axes based at least in part on the calculated primary criteria values; and
   outputting the digital model with the selected orientation of the digital model to an additive manufacturing system.

15. The method of claim 14, wherein the build score is further calculated as a function of a total surface area of the digital model.

16. The method of claim 14, and further comprising evaluating the digital model for part strength.

17. The method of claim 14, and further comprising printing the three-dimensional part with the additive manufacturing system based on the oriented digital model.

* * * * *